US012089021B2

(12) United States Patent
Yan

(10) Patent No.: US 12,089,021 B2
(45) Date of Patent: Sep. 10, 2024

(54) METHOD AND APPARATUS FOR LISTENING SCENE CONSTRUCTION AND STORAGE MEDIUM

(71) Applicant: Tencent Music Entertainment Technology (Shenzhen) Co., Ltd., Guangdong (CN)

(72) Inventor: Zhenhai Yan, Guangdong (CN)

(73) Assignee: Tencent Music Entertainment Technology (Shenzhen) Co., Ltd., Guangdong (CN)

( * ) Notice: Subject to any disclaimer, the term of this patent is extended or adjusted under 35 U.S.C. 154(b) by 102 days.

(21) Appl. No.: 17/751,960

(22) Filed: May 24, 2022

(65) Prior Publication Data

US 2022/0286781 A1 Sep. 8, 2022

Related U.S. Application Data

(63) Continuation of application No. PCT/CN2020/074640, filed on Feb. 10, 2020.

(30) Foreign Application Priority Data

Nov. 25, 2019 (CN) ......................... 201911169274.2

(51) Int. Cl.
*H04R 5/04* (2006.01)
*H04S 7/00* (2006.01)

(52) U.S. Cl.
CPC ............... *H04R 5/04* (2013.01); *H04S 7/301* (2013.01); *H04S 7/302* (2013.01); *H04S 2420/01* (2013.01)

(58) Field of Classification Search
CPC ........... H04R 5/04; H04R 5/033; H04S 7/301; H04S 7/302; H04S 2420/01; H04S 1/005; H04S 1/002
See application file for complete search history.

(56) References Cited

U.S. PATENT DOCUMENTS

2004/0230391 A1 11/2004 Jorgensen
2013/0065213 A1* 3/2013 Gao ....................... G10H 1/365 434/307 A (Continued)

FOREIGN PATENT DOCUMENTS

CN 105117021 A 12/2015
CN 105120418 * 12/2015 .............. H04S 1/00

(Continued)

OTHER PUBLICATIONS

JPO, Notice of Reasons for Refusal for corresponding Japanese Patent Application No. 2022-530306, Jul. 18, 2023, 9 pages.

(Continued)

*Primary Examiner* — Yosef K Laekemariam
(74) *Attorney, Agent, or Firm* — IP Spring

(57) ABSTRACT

A method and an apparatus for virtual listening scene construction and a storage medium are provided. The method includes the following. Target audio is determined, where the target audio is used to characterize a sound feature in a target scene. A position of a sound source of the target audio is determined. Dual-channel audio of the target audio is obtained by performing audio-visual modulation on the target audio according to the position of the sound source, where the dual-channel audio of the target audio during simultaneous output is able to produce an effect that the target audio is from the position of the sound source. The dual-channel audio of the target audio is rendered into target music to produce an effect that the target music is played in the target scene.

20 Claims, 14 Drawing Sheets

(56) References Cited

U.S. PATENT DOCUMENTS

| | | | |
|---|---|---|---|
| 2018/0100889 A1 | 4/2018 | Swamy et al. | |
| 2018/0221621 A1 | 8/2018 | Kanemaru et al. | |
| 2019/0313200 A1* | 10/2019 | Stein | G06F 3/011 |

FOREIGN PATENT DOCUMENTS

| | | | |
|---|---|---|---|
| CN | 105120418 | A | 12/2015 |
| CN | 105792090 | A | 7/2016 |
| CN | 106572419 | A | 4/2017 |
| CN | 106993249 | A | 7/2017 |
| CN | 206759672 | U | 12/2017 |
| CN | 108616789 | A | 10/2018 |
| CN | 108829254 | A | 11/2018 |
| CN | 110270094 | A | 9/2019 |
| CN | 110488225 | A | 11/2019 |
| JP | H11243598 | A | 9/1999 |
| JP | 2000132150 | A | 5/2000 |
| JP | 2006174052 | A | 6/2006 |
| WO | 02078312 | A1 | 10/2002 |
| WO | 2018079850 | A1 | 5/2018 |

OTHER PUBLICATIONS

CNIPA, International Search Report for corresponding International Patent Application No. PCT/CN2020/074640, Jul. 22, 2020, 10 pages.
CNIPA, First Office Action for corresponding Chinese Patent Application No. 201911169274.2, Dec. 11, 2020, 21 pages.
CNIPA, Notice of Allowance for corresponding Chinese Patent Application No. 201911169274.2, May 27, 2021, 8 pages.

* cited by examiner

METHOD AND APPARATUS FOR LISTENING SCENE CONSTRUCTION AND STORAGE MEDIUM

CROSS-REFERENCE TO RELATED APPLICATION(S)

This application a continuation under 35 U.S.C. § 120 of International Patent Application No. PCT/CN2020/074640, filed Feb. 10, 2020, which claims priority under 35 U.S.C. § 119(a) and/or PCT Article 8 to Chinese Patent Application No. 201911169274.2, filed on Nov. 25, 2019, the entire disclosure of which are hereby incorporated by reference.

TECHNICAL FIELD

The disclosure relates to the field of audio processing, and more particularly, to a method and an apparatus for listening scene construction and a storage medium.

BACKGROUND

Music is an art that reflects emotions of humans in real life, which can cultivate sentiment of people, stimulate imagination of people, and enrich spiritual life of people. With popularity of electronic devices, various playing devices can be used by people to play music. In order to improve listening experience of a user, various sound effect elements are built in a playing device for the user to choose, so that various sound effect elements can be artificially added to the music to achieve a special playing effect when the music is played by the user. For example, when the playing device plays Daoxiang of Jay Chou, a pastoral sound effect element can be selected to be added to the song by the user to play together with the song. However, an added sound effect element played by the playing device is simply mixed into original music, and the sound effect element is fixed, such that it is difficult for the user to feel an artistic conception constructed by the sound effect element, thereby affecting a sense of realism and immersion of the user during listening to music.

Therefore, how to use the sound effect element to construct a more real listening scene when the user listens to the music is a problem studied by those skilled in the art.

SUMMARY

According to a first aspect, a method for listening scene construction is provided in implementations of the disclosure. The method includes the following. Target audio is determined, where the target audio is used to characterize a sound feature in a target scene. A position of a sound source of the target audio is determined. Dual-channel audio of the target audio is obtained by performing audio-visual modulation on the target audio according to the position of the sound source, where the dual-channel audio of the target audio during simultaneous output is able to produce an effect that the target audio is from the position of the sound source. The dual-channel audio of the target audio is rendered into target music to produce an effect that the target music is played in the target scene.

According to a second aspect, an apparatus for listening scene construction is provided in implementations of the disclosure. The apparatus includes a memory configured to store computer programs and a processor configured to invoke the computer programs to: determine target audio, where the target audio is used to characterize a sound feature in a target scene, determine a position of a sound source of the target audio, obtain dual-channel audio of the target audio by performing audio-visual modulation on the target audio according to the position of the sound source, where the dual-channel audio of the target audio during simultaneous output is able to produce an effect that the target audio is from the position of the sound source, and render the dual-channel audio of the target audio into target music to produce an effect that the target music is played in the target scene.

According to a third aspect, a non-volatile computer storage medium is provided in implementations of the disclosure. The computer storage medium includes computer programs which, when running on an electronic device, are operable with the electronic device to perform the method provided in the first aspect.

BRIEF DESCRIPTION OF THE DRAWINGS

In order to describe more clearly technical solutions in implementations of the disclosure or the related art, the following will give a brief introduction to the accompanying drawings required in implementations of the disclosure or in the background.

DETAILED DESCRIPTION

The following will describe clearly and completely technical solutions in implementations of the disclosure with reference to the accompanying drawings.

In implementations of the disclosure, a method is provided, which can improve a sense of presence and immersion of a user when listening to music. In implementations of the disclosure, a sound effect element that can characterize a listening scene is mixed into the music when the user is listening to the music. When audio of the sound effect element is mixed into the music, audio-visual modulation is performed on the audio of the sound effect element according to a position of a sound source, such that the sound effect element when entering ears seems to come from the position of the sound source, thereby improving a sense of presence and immersion of the user when listening to music.

Figure 1:
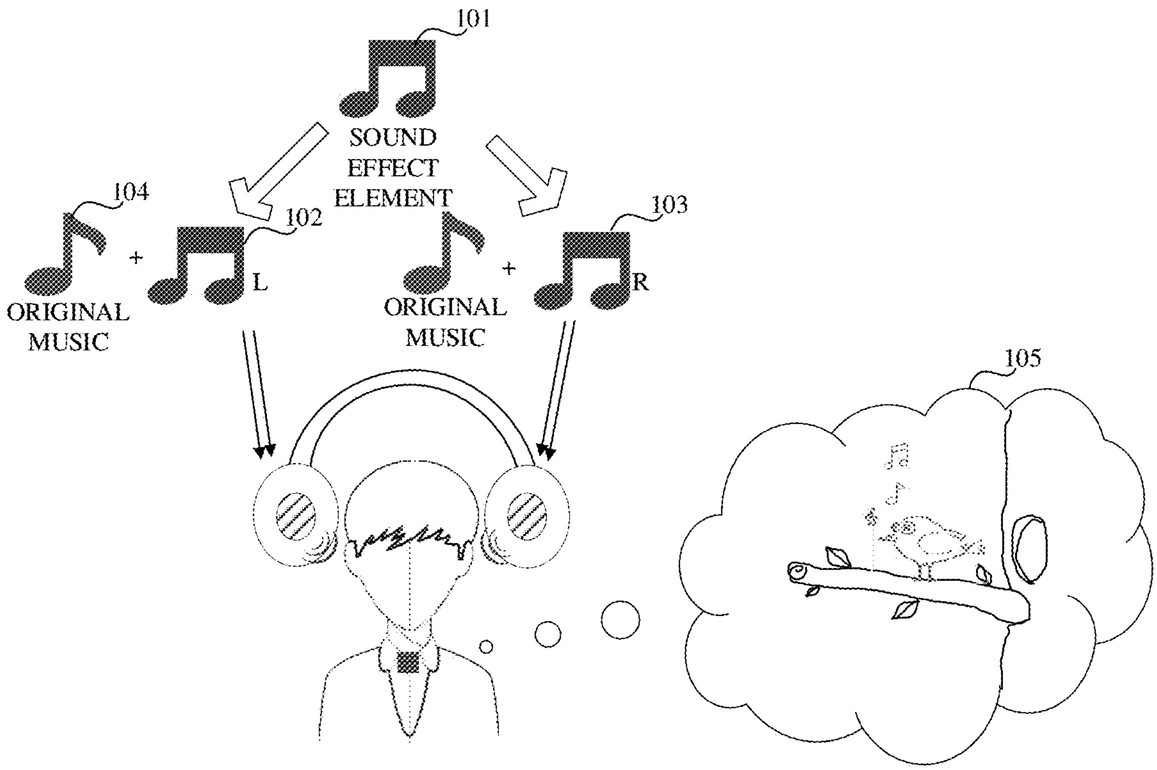
FIG. 1 is a schematic scene diagram illustrating a method for virtual listening scene construction provided in implementations of the disclosure.

Referring to FIG. 1, FIG. 1 is a schematic scene diagram illustrating a method for virtual listening scene construction provided in implementations of the disclosure. The method can be implemented through an electronic device such as a computer, a phone, or the like. The electronic device is related to processing for audio 101 of a sound effect element, left channel audio 102 of the sound effect element obtained by performing the audio-visual modulation, right channel audio 103 of the sound effect element obtained by performing the audio-visual modulation, and original music 104, during performing the method for constructing a virtual listening scene 105.

The audio 101 of the sound effect element may be audio of a sound effect element matched according to a type or lyric of the original music 104, or audio of a sound effect element determined by receiving a selection operation of a user. The audio of the sound effect element may characterize features of some scenes. For example, a sound of a scene of mountain forest can be characterized by a sound of birds chirping or a sound of leaves shaking.

The left channel audio 102 and the right channel audio 103 are obtained by performing the audio-visual modulation on the audio 101 of the sound effect element. A position of a sound source in the audio of the sound effect element needs to be determined firstly before performing the audio-visual modulation, because audio may need a fixed sound source or a sound source with a certain moving track. For example, relative to a listener, a sound of leaves in a scene may come from a fixed position, but a sound of birds may come from far to near or from left to right. Therefore, a position of the sound source at each of multiple time nodes needs to be determined according to a preset time interval. A position of a sound source in space can be represented by a three-dimensional (3D) coordinate, e.g., a coordinate of [azimuth, elevation, distance]. Processing such as frame division or windowing is performed on the audio of the sound effect element after determining the position of the sound source at each of the multiple time nodes, then a head-related transfer function (HRTF) from a position of the sound source in an audio frame to left and right is determined, and the left channel audio 102 and the right channel audio 103 are obtained by convolving the HRTF from the position of the sound source to a left ear and a right ear respectively with the audio frame, i.e., the HRTF from the position of the sound source to the left ear and the right ear respectively is convolved with single-channel audio to form binaural audio. When the left channel audio 102 and the right channel audio 103 are simultaneously played in the left ear and the right ear respectively, the listener may feel an effect that the sound effect element is from the position of the sound source.

Optionally, the sound effect element 101 may be an audio file that can characterize a scene, such as a sound of waves, a sound of leaves, a sound of running water, or the like, and may be stored in an audio format such as windows media audio (WMA) format, moving picture experts group audio layer III (MP3), or the like. The audio of the sound effect element is referred to as target audio below.

The original music 104 is an audio file that can be played. The original music during playing can be mixed with the left channel audio 102 and right channel audio 103 of the sound effect element, and the mixed music can be played in the left ear and the right ear, so that when the mixed music is played with a playing device, in addition to listening to the original music 104, the user may also feel a special scene element lingering around ears and feel like he is really in a listening scene 106.

Optionally, the original music 104 may be an audio file in various formats such as WMA format, MP3, or the like, which can be played with a playing device such as an earphone, or the like, and the original music is referred to as target music below. Optionally, the electronic device can also serve as the playing device and be used to play the mixed music. In this case, the playing device is a playing module integrated into the electronic device, and the electronic device may be a device such as a smart earphone with a calculation capability. Optionally, the electronic device can transmit the mixed music to the playing device through a wired interface, a wireless interface (e.g., a wireless fidelity (WiFi) interface, a Bluetooth interface), or other manners, and the playing device is used to play the mixed music. In this case, the electronic device may be a server (or a server cluster), a computer host, or other electronic devices, and the playing device may be a device such as a Bluetooth earphone, a wired earphone, or the like.

That is, the listener may feel a unique virtual listening environment, for example, by adding some special sound effect parts or rendering sound effects in the listening scene 106. Common listening scenes mainly include seaside, window, suburb, and the like, which can be created by adding some sound effect elements.

Figure 2:
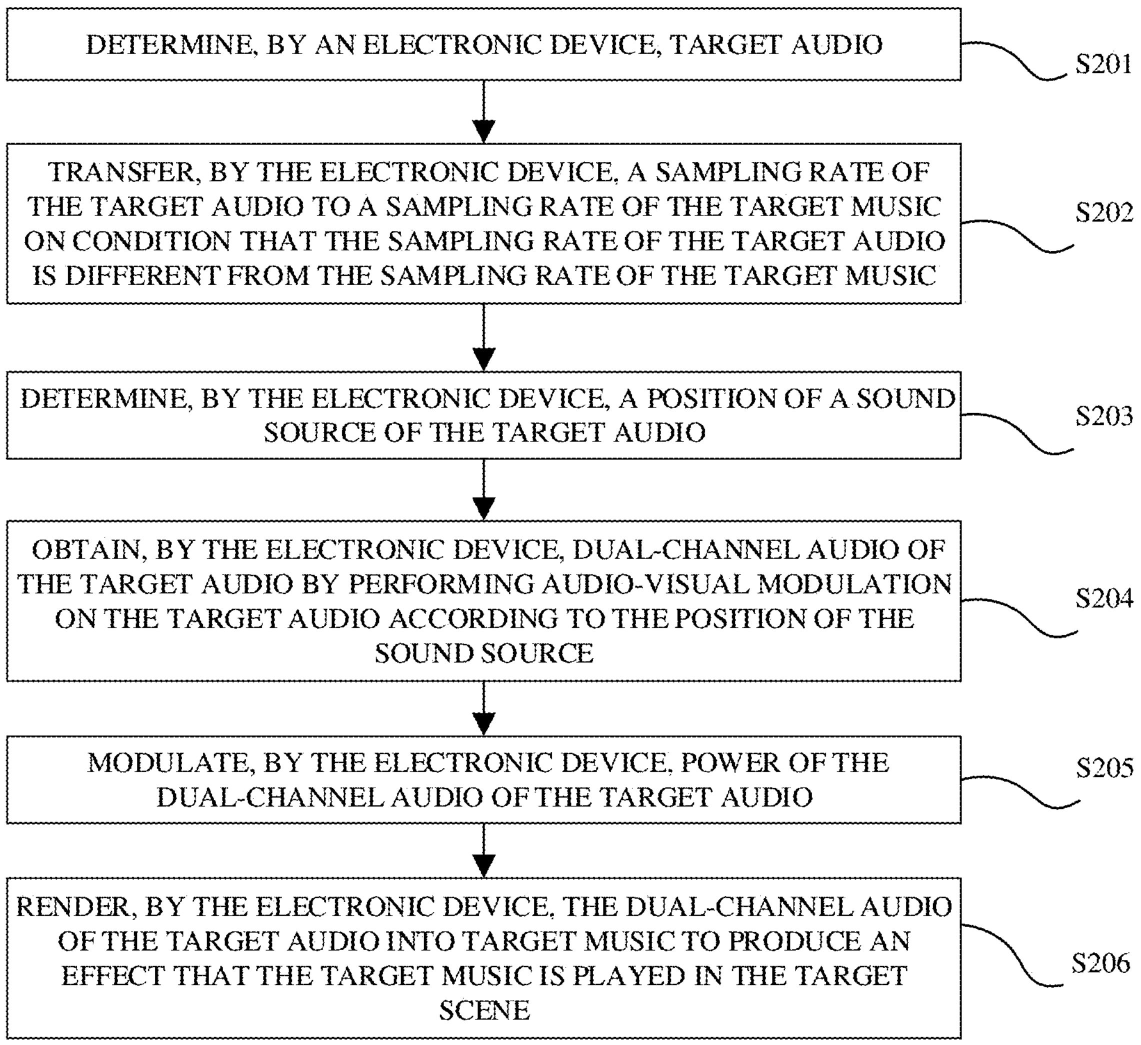
FIG. 2 is a schematic flowchart illustrating a method for virtual listening scene construction provided in implementations of the disclosure.

Referring to FIG. 2, FIG. 2 is a schematic flowchart illustrating a method for listening scene construction provided in implementations of the disclosure, the method includes the following.

At S201, an electronic device determines target audio.

Specifically, the electronic device may be a device with a computation capability, such as a phone, a computer, or the like, the target audio is audio of a sound effect element mixed into target music, and the target music may be a music file such as a song, a tape, or the like. The electronic device can determine the target audio in the following optional manners.

In manner 1, the target audio is determined according to type information of the target music. The electronic device can pre-store the type information of the target music or a label of the type information of the target music, or can obtain the type information of the target music or the label of the type information through a wired interface, a wireless interface, or other manners. The electronic device matches a sound effect element according to the type information of the target music or the label of the type information of the target music, and determines the target audio according to a matching parameter of the sound effect element. Optionally, one song may have multiple types or labels. For higher relevance between the target audio and the target music, a first matching threshold can be preset when the sound effect element is matched. Specifically, the electronic device obtains matching parameters of one or more sound effect elements by matching the one or more sound effect elements according to the type information of the target music or the label of the type information, and determines audio of one or more sound effect elements with matching parameters higher than the first matching threshold as the target audio. Optionally, before a vocal part of the song occurs and after the vocal part ends (i.e., when the song only has an accompaniment), the target audio is determined in manner 1.

Figure 3:
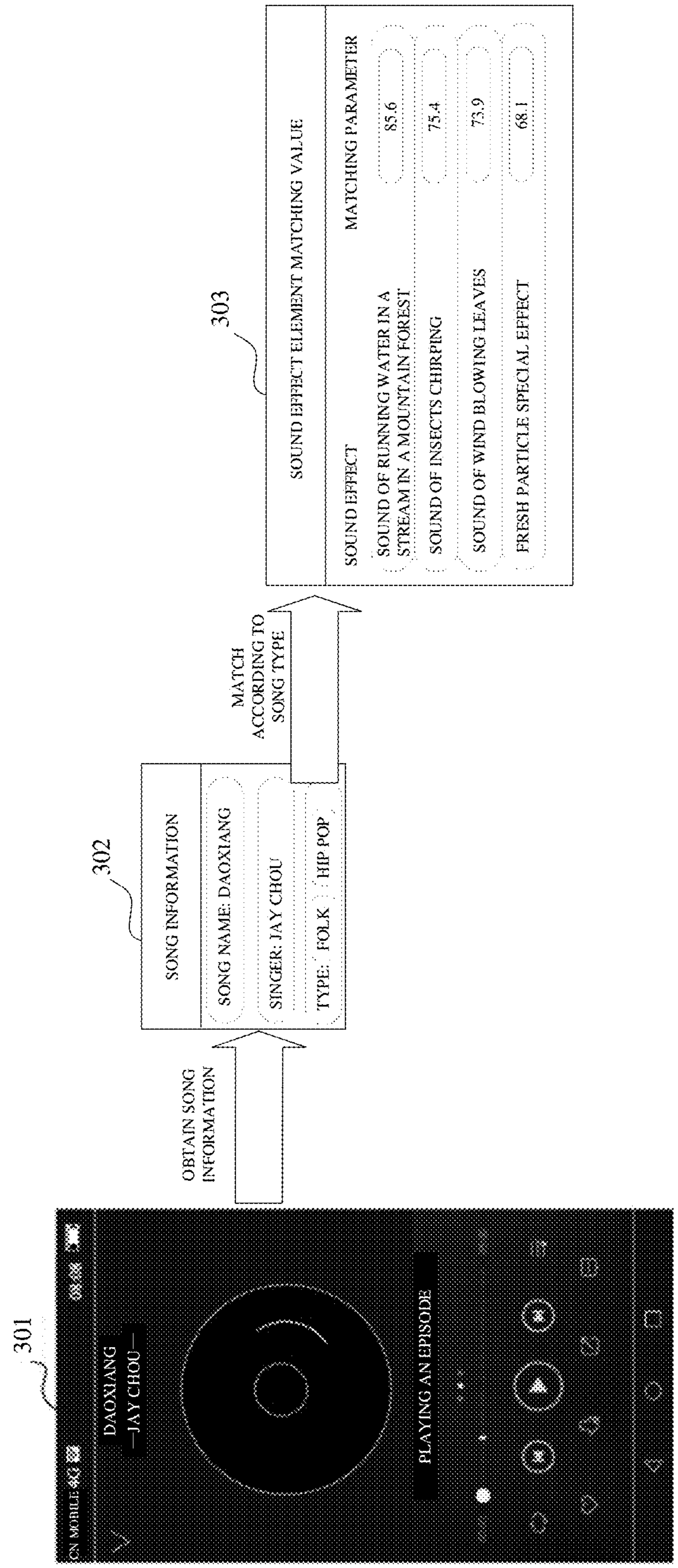
FIG. 3 is a schematic diagram illustrating a method for determining target audio provided in implementations of the disclosure.

In case 1, referring to FIG. 3, FIG. 3 is a schematic diagram illustrating a possible method for determining target audio provided in implementations of the disclosure, where target music 301, song information 302, and matching information 303 are included. The target music may be a song of Daoxiang of a singer Jay Chou, and the electronic device pre-stores type information of Daoxiang in the song information 302, i.e., Daoxiang is a folk song and is also belongs to a hip-hop type, so that matching parameters of multiple sound effect elements are obtained by matching the multiple sound effect elements according to type information of folk music and hip hop. In order to ensure that a selected sound effect element is not abrupt when mixing, the electronic device can preset the first matching threshold when the target audio is determined. For example, the first matching threshold is preset as 75.0, which indicates that only audio of a sound effect element with a matching parameter higher than 75.0 can be determined as the target audio. Optionally, the electronic device can preset the number of selected sound effect elements in order to control the number of selected sound effect elements, e.g., the number of selected sound effect elements is preset as 2, which indicates that among sound effect elements with matching parameters higher than 75.0, audio of sound effect elements with top two matching parameters are determined as the target audio. Referring to FIG. 3, it can be seen that, before a vocal part of Daoxiang occurs, "sound of running water in a stream in a mountain forest" and "sound of insects chirping" both can be determined as the target audio. "Fresh particle special effect" cannot be determined as the target audio because its matching parameter is lower than the first matching threshold. "Sound of wind blowing leaves", although a matching parameter of which is higher than the first matching threshold, cannot be determined as the target audio because it is preset that only two sound effect elements can be selected.

In manner 2, the target audio is determined according to whole lyrics of the target music. The electronic device can pre-store the whole lyrics of the target music, or can obtain the whole lyrics of the target music through a wired interface, a wireless interface, or other manners. The electronic device obtains a matching parameter of a sound effect element by matching the sound effect element according to the whole lyrics, and determines the target audio according to the matching parameter of the sound effect element. For higher relevance between the target audio and the target music, a second matching threshold can be preset when the sound effect element is matched. Specifically, the electronic device can obtain matching parameters of one or more sound effect elements by matching the one or more sound effect elements with the whole lyrics of the target music according to a text matching algorithm, and determine audio of one or more sound effect elements with matching parameters higher than the second matching threshold as the target audio. The second matching threshold may or may not be equal to the first matching threshold, which is not limited herein. Optionally, before the vocal part of the song occurs and after the vocal part ends (i.e., when the song only has the accompaniment), the target audio is determined in manner 2.

In case 2, the electronic device pre-stores whole lyrics of Daoxiang, and matches multiple sound effect elements according to the whole lyrics of Daoxiang when determining the target audio. If the electronic device presets the second matching threshold as 76.0, audio of a sound effect element with a matching parameter higher than 76.0 can be determined as the target audio. Optionally, the electronic device can preset the number of selected sound effect elements in order to control the number of selected sound effect elements, e.g., the number of selected sound effect elements is preset as 3, which indicates that among sound effect elements with matching parameters higher than 76.0, audio of sound effect elements with top three matching parameters are determined as the target audio.

In manner 3, the target audio is determined according to a lyric content of the target music, where the lyric content of the target music is a word, a term, a short sentence, a sentence, or other specific contents of lyrics. The electronic device can pre-store the lyric content of the target music, or can obtain the lyric content of the target music through a wired interface, a wireless interface, or other manners. The electronic device obtains a matching parameter of a sound effect element by matching the sound effect element according to the lyric content, and determines the target audio according to the matching parameter of the sound effect element. For higher relevance between the target audio and the target music, a third matching threshold can be preset when the sound effect element is matched. Specifically, the electronic device can segment the lyrics into specific contents such as a word, a term, or a short sentence according to a word segmentation algorithm, obtain matching parameters of one or more sound effect elements by matching the one or more sound effect elements with the lyric content of the target music according to the text matching algorithm, and determine audio of one or more sound effect elements with matching parameters higher than the third matching threshold as the target audio. The third matching threshold may or may not be equal to the first matching threshold and the second matching threshold, which is not limited herein. Optionally, at a vocal singing stage of the target music (i.e., after the vocal part occurs and before the vocal part ends), the target audio is determined in manner 3.

Figure 4:
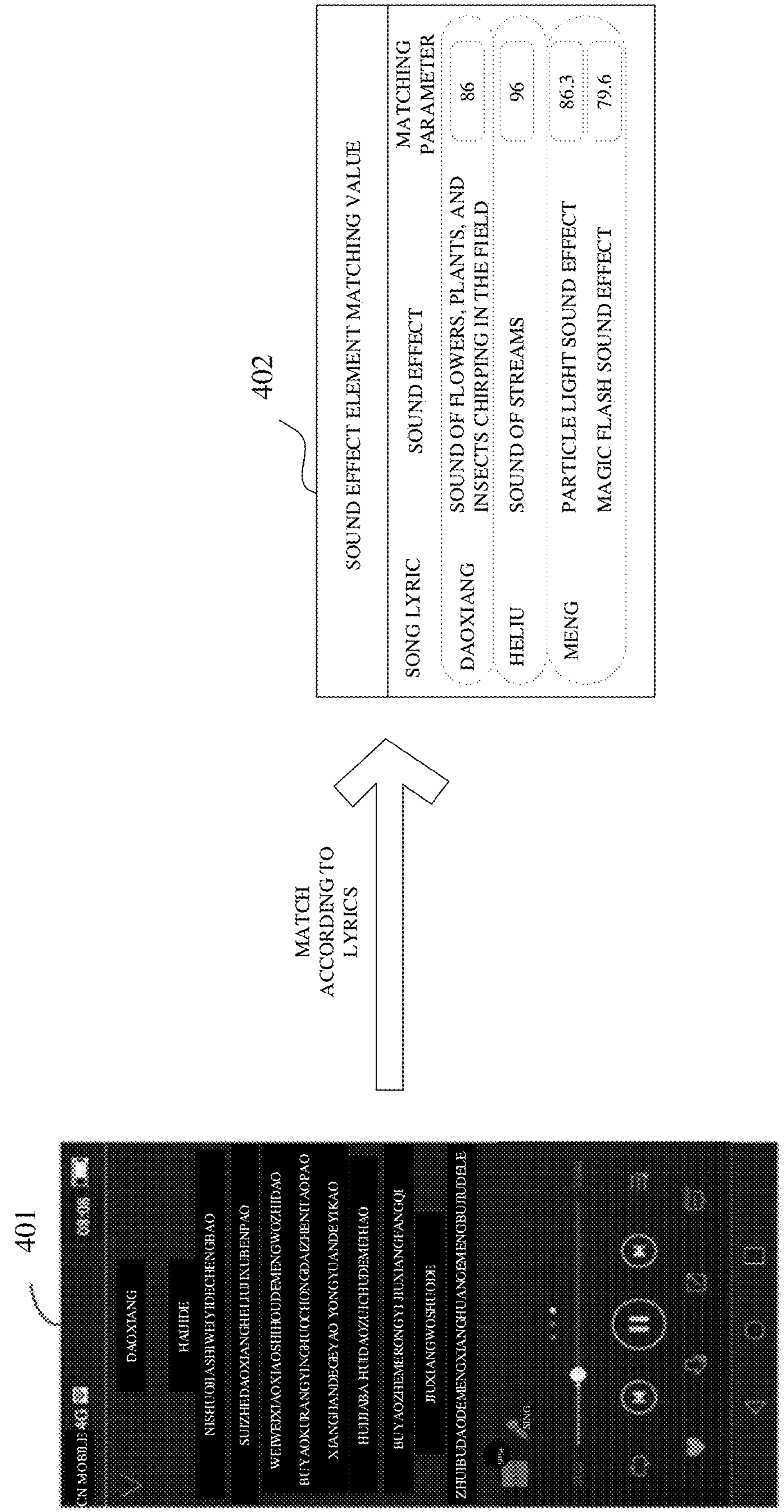
FIG. 4 is a schematic diagram illustrating another method for determining target audio provided in implementations of the disclosure.

In case 3, referring to FIG. 4, FIG. 4 is a schematic diagram illustrating another possible method for determining target audio provided in implementations of the disclosure, target music 401 and matching information 402 are included, where the target music may be Daoxiang. The electronic device segments the lyrics of Daoxiang into specific lyric contents such as a word, a term, or a short sentence according to the word segmentation algorithm, and can obtain matching parameters of one or more sound effect elements respectively matched with one or more texts by performing text matching on the specific lyric contents of Daoxiang, i.e., matching the one or more sound effect elements according to specific texts in the lyrics. Since a main part of the music is in the vocal singing stage of Daoxiang and the sound effect element needs to have strong relevance with the text, a third matching threshold can be preset when the target audio is determined, and only audio of a sound effect element with a matching parameter higher than the third matching threshold can be determined as the target audio. For example, only audio of a sound effect element with a matching parameter higher than 85.0 can be determined as the target audio. Referring to FIG. 4, if the third matching threshold is preset as 85.0, sound effect elements "particle light sound effect" and "magic flash sound effect" are matched with a lyric text of "dream" in the song of Daoxiang, where a matching parameter of "magic flash sound effect" is only 79.6, so audio of "magic flash sound effect" cannot be determined as the target audio. Optionally, the number of selected sound effect elements can be preset, e.g., the number of selected sound effect elements is preset as 3, which indicates that among sound effect elements with matching parameters higher than 85.0, audio of sound effect elements with top three matching parameters are determined as the target audio.

In manner 4, the electronic device determines the target audio by providing the user with multiple options of audio of sound effect elements to select from and receiving a selection operation of the user for the target audio. Specifically, the electronic device contains an information input device such as a touchable screen or the like to receive an input operation of the user, and determines audio indicated by the input operation as the target audio.

Figure 5:
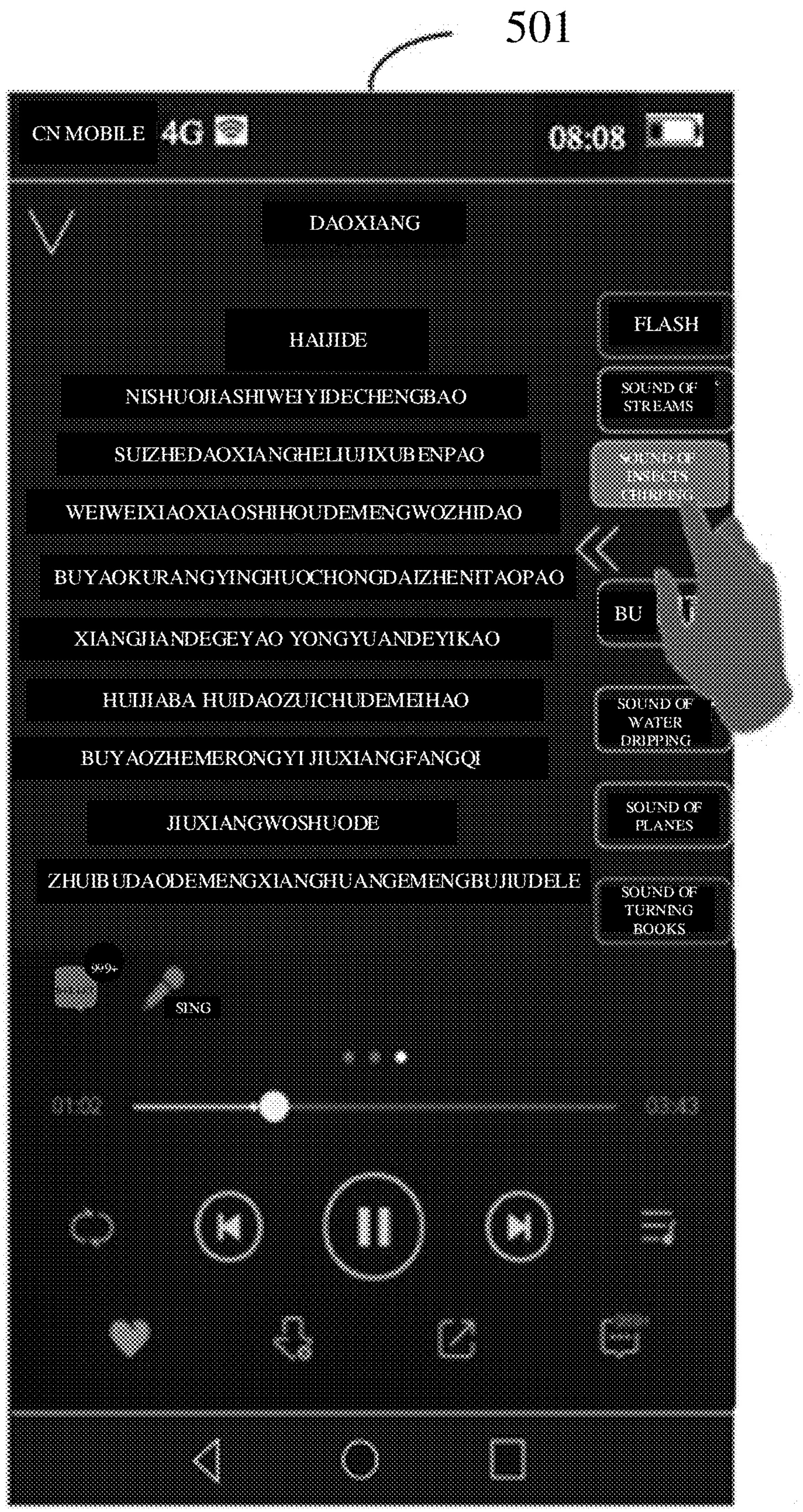
FIG. 5 is a schematic diagram illustrating another method for determining target audio provided in implementations of the disclosure.

In case 4, referring to FIG. 5, FIG. 5 is a schematic diagram illustrating another method for determining target audio provided in implementations of the disclosure. An electronic device is equipped with a display screen, where a playing interface of Daoxiang of Jay Chou is displayed on the display screen. During playing of Daoxiang, an option label characterizing audio of a sound effect element can be clicked or dragged by the user to a desired mixing time, such that the audio of the sound effect element selected by the user is determined as the target audio. Optionally, the sound effect element can be dragged by the user into a term or short sentence of a lyric, so that a timestamp of music corresponding to the lyric is the mixing time of the target audio selected by the user, where the timestamp refers to time data, generally, a character sequence that can identify time of a song.

At S202, the electronic device transfers a sampling rate of the target audio to a sampling rate of the target music on condition that the sampling rate of the target audio is different from the sampling rate of the target music.

Specifically, after the target audio is determined, the target audio may sound abrupt when mixed into the target music if the sampling rate of the target audio is different from the sampling rate of the target music. Therefore, the sampling rate of the target audio needs to be transferred to the sampling rate of the target music, such that the sound effect element may sound more natural when mixed. For example, the sampling rate of the target audio is 44100 hertz (Hz) and the sampling rate of the target music is 48000 Hz, so the sampling rate of the target audio can be transferred to 48000 Hz, such that the target audio may sound more natural when mixed. Optionally, a step of transferring the sampling rate of the target audio may not be performed. If the sampling rate of the target audio is different from the sampling rate of the target music, the target audio sounds more abrupt when mixed into the target music on condition that the sampling rate of the target audio is not transferred, and a scene effect produced by the target audio may also be less suitable for the target music.

At S203, the electronic device determines a position of a sound source of the target audio.

Specifically, a position of any one sound source in space can be a position parameter of the sound source and represented by a 3D coordinate. For example, relative to the listener, the position of the sound source can be represented by the 3D coordinate of [azimuth, elevation, distance]. In different scenes, the position of the sound source may be fixed or changing, e.g., a position of a sound source of a sound of insects chirping or the like may be fixed, and a position of a sound source of a sound of waves, a sound of wind, or the like may need to change continuously. For example, before the vocal part begins, i.e., at a beginning of the music, the target audio needs to come from far to near, which produces an effect of the music floating slowly. The position of the sound source can be determined through the following optional methods.

In method 1, the electronic device pre-stores the position of the sound source in the target audio. Specifically, the electronic device pre-stores a correspondence between the target audio and the position of the sound source in the target audio, and after determining a target sound source, the electronic device determines the position of the sound source according to the target audio and the correspondence between the target audio and the position of the sound source.

In method 2, the electronic device determines the position of the sound source according to a time of determining the target audio. Specifically, the electronic device pre-stores a position of the sound source at each of different stages of the target music. For example, if the time of determining the target audio is before the vocal part of the target music occurs, a position of the target audio can be from far to near, and if the time of determining the target audio is after the vocal part of the target music ends, the position of the target audio can be from far to near.

In method 3, the position of the sound source selected by an operation of the user is received. Specifically, the electronic device can provide the user with a position range, a position option, a movement speed, a movement direction, or other options of the position of the sound source, and receive the position of the sound source indicated by an input operation or selection operation of the user as the position of the sound source of the target audio.

Optionally, the electronic device can be integrated with a unit for calculating the position of the sound source, which can obtain a position of the sound source more suitable for the target audio based on big data or artificial intelligence (AI) technology by simulating positions of different sound sources. Optionally, the electronic device can also receive a position of a sound source sent by other training platforms for professional sound source position calculation, which will not be repeated herein.

After the position of the sound source of the target audio is determined, specifically, when a position is generated, the following situations may occur.

Figure 6:
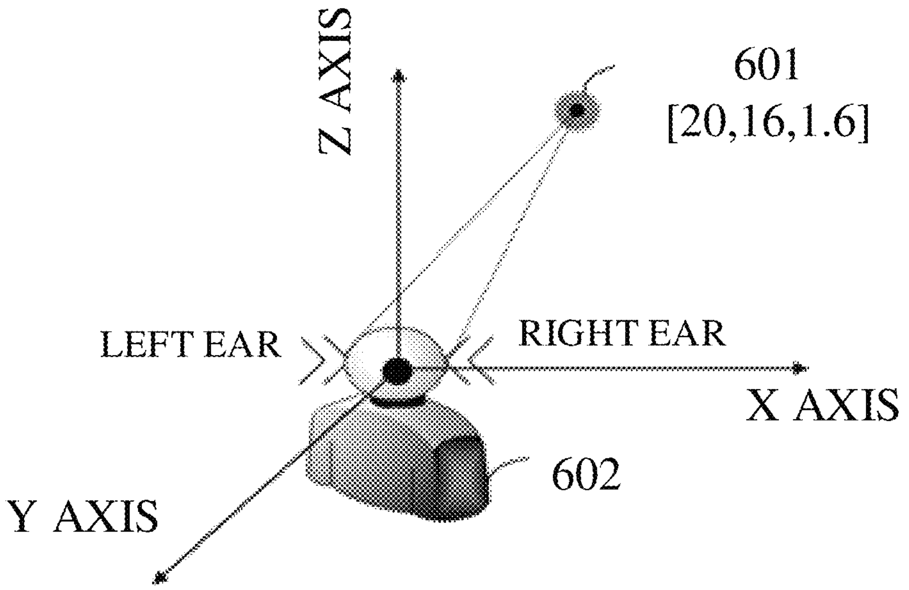
FIG. 6 is a schematic diagram illustrating a position of a sound source provided in implementations of the disclosure.

In situation 1, the position of the sound source of the target audio is fixed and then represented by a fixed position parameter. For example, referring to FIG. 6, FIG. 6 is a schematic diagram illustrating a possible position of a sound source provided in implementations of the disclosure, a position 601 of the sound source of the target audio and a listener 602 are included, where the position of the sound source is represented by the 3D coordinate of [azimuth, elevation, distance]. The position 601 is represented by [20, 16, 1.6], which can indicate that for the position of the sound source of the target audio relative to the listener 602, the azimuth is 20°, the elevation is 16°, and the distance is 1.6 meters (m).

Figure 7:
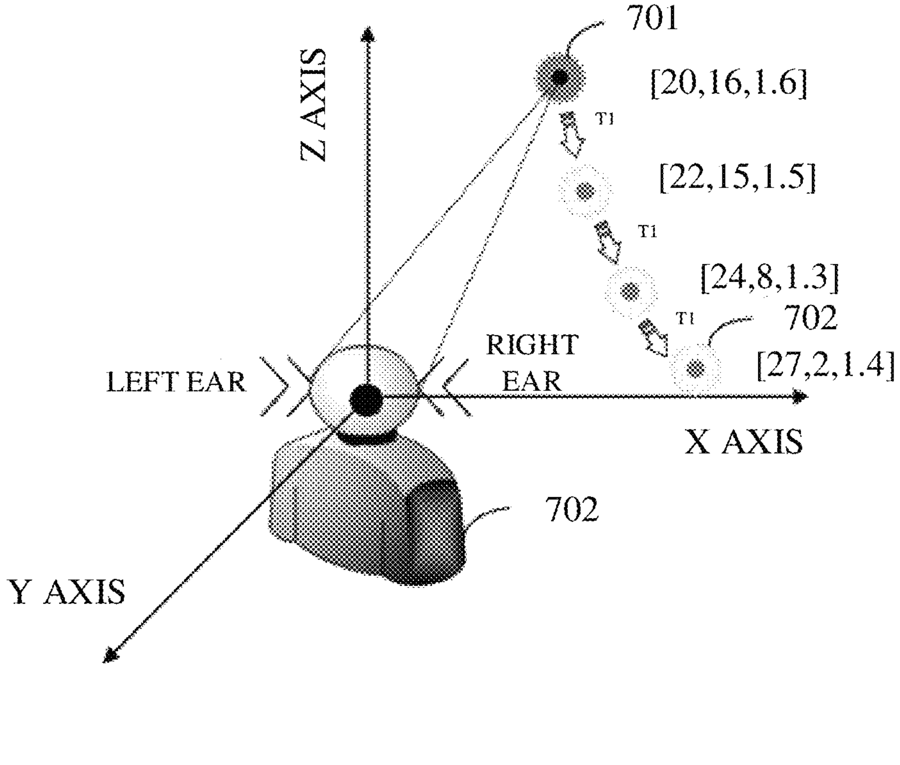
FIG. 7 is a schematic diagram illustrating another position of a sound source provided in implementations of the disclosure.

In situation 2, referring to FIG. 7, FIG. 7 is a schematic diagram illustrating a changing position of a sound source provided in implementations of the disclosure, a start position 701 of the target audio, an end position 702 of the target audio, and the listener 602 are included, where the position of the sound source is represented by the 3D coordinate of [azimuth, elevation, distance]. The sound source of the target audio during playing needs to be moved from the position 701 to the position 702. The position of the sound source of the target audio at each of multiple time nodes is determined according to a preset first time interval T1. For example, if the first time interval T1 is preset as 0.1 second (s), the position of the sound source is determined every 0.1 s. At a start time, for the position of the sound source of the target audio relative to the listener 602, the azimuth is 20°, the elevation is 16°, and the distance is 1.6 m. At 0.1 s after the start time, for the position of the sound source of the target audio relative to the listener 602, the azimuth is 22°, the elevation is 15°, and the distance is 1.5 m, thereby obtaining the position of the sound source at each of the multiple time nodes.

At S204, the electronic device obtains dual-channel audio of the target audio by performing audio-visual modulation on the target audio according to the position of the sound source.

Specifically, the position of the sound source may be fixed or changing, and the target audio sounds like it is from the position of the sound source through the audio-visual modulation. The electronic device obtains the dual-channel audio of the target audio by respectively performing the audio-visual modulation on the target audio according to the position of the sound source of the target audio corresponding to each of the multiple time nodes. A method for the audio-visual modulation may be convoluting an HRTF, a time delay method, a phase difference method, or other methods for audio-visual modulation.

As an optimized scheme, in order to ensure an audio-visual modulation effect as much as possible, the electronic device can firstly perform pre-emphasis processing and normalization processing on the target audio. The pre-emphasis processing is a processing method for improving a high-frequency component of audio. In practice, a power spectrum of the audio decreases with the increase of a frequency, and most energy of the audio is concentrated in a low-frequency range, which causes a signal-to-noise ratio of the audio at a high-frequency end to drop to an unacceptable level. Therefore, the pre-emphasis processing is used to increase high-frequency resolution of the audio. Specifically, the pre-emphasis processing can be realized through a high-pass digital filter. The above normalization processing is a normal information processing method for simplifying calculation, which transfers a dimensional processing object to a dimensionless processing object, such that a processing result can have a wider applicability.

The electronic device divides the target audio into multiple audio frames according to a preset second time interval T2, after pre-emphasizing and normalizing the target audio. An audio signal is a signal changing with time and can be considered to be approximately unchanged in a short period of time (generally 10~30 millisecond (ms)), i.e., the audio has short-term stability. Frame division processing can be performed on the target audio, and the target audio can be divided into the multiple audio frames (which can also be referred to as analysis frames) for processing according to the preset second time interval T2. Optionally, the second time interval of the audio frame can be preset as 0.1*Fs, where Fs is a current sampling rate of the target audio.

Figure 8:
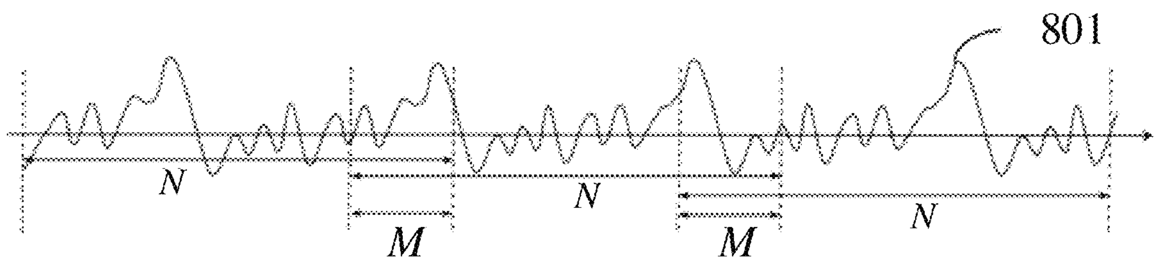
FIG. 8 is a schematic diagram illustrating a possible method for frame division processing provided in implementations of the disclosure.
Figure 9:
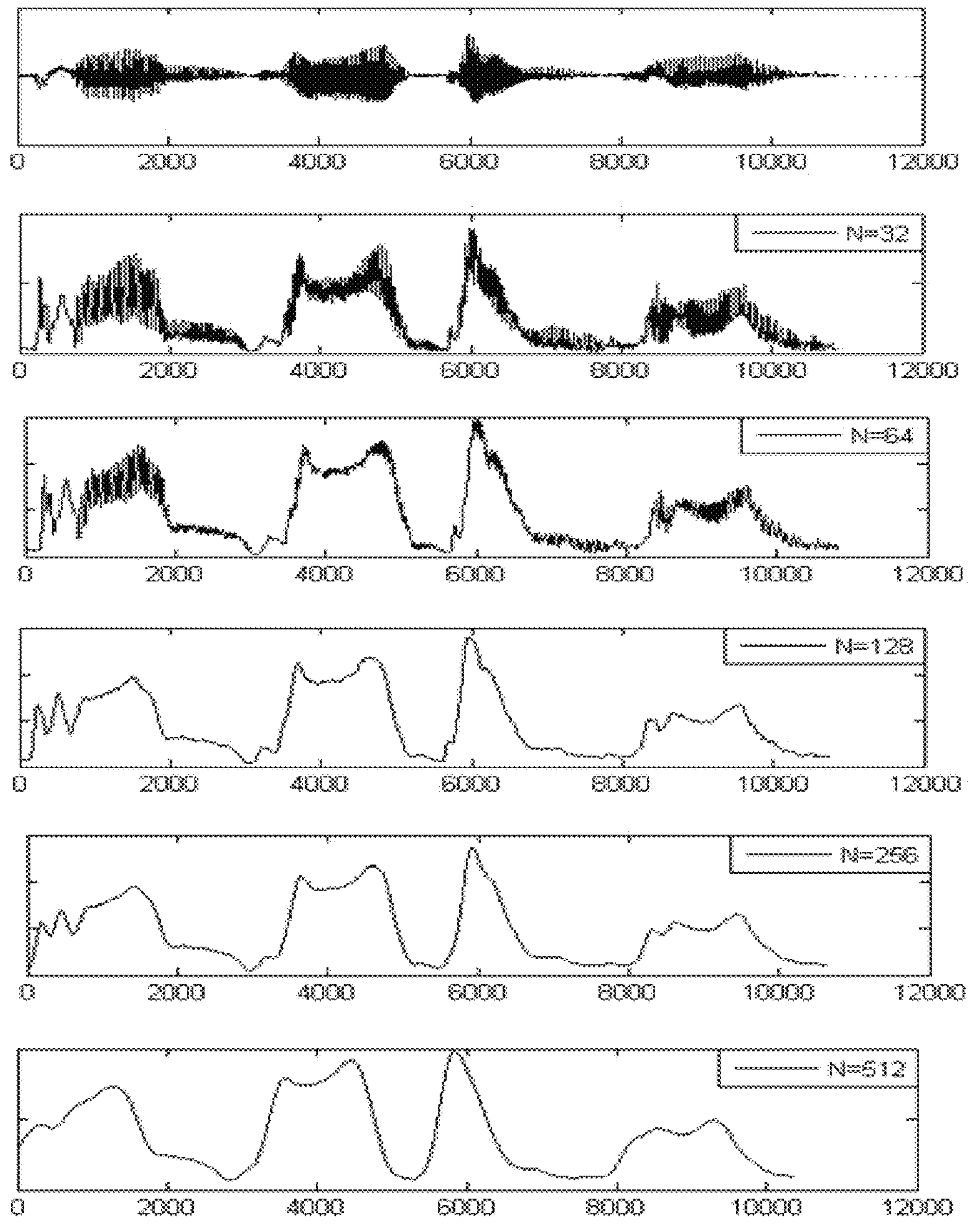
FIG. 9 is a schematic diagram illustrating an effect of windowing processing provided in implementations of the disclosure.

When performing the frame division processing on the target audio, the electronic device can perform weighting by using a movable window with a limited length, i.e., windowing and frame division processing, to solve a problem of frequency spectrum leakage due to destruction of naturalness and continuity of the audio resulted from the frame division processing on the audio. During the frame division processing, the number of audio frames per second can be 33~100, depending on an actual situation. The frame division processing can use a continuous segmentation method or an overlapping segmentation method. The overlapping segmentation is used to achieve a smooth transition between audio frames and keep their continuity. An overlapping part between a previous frame and a next frame is referred to as a frame shift, and a ratio of the frame shift to a frame length is generally 0~0.5, where the frame length is the number of sampling points of an audio frame or a sampling time of an audio frame. Referring to FIG. 8, FIG. 8 is a schematic diagram illustrating a possible method for frame division processing provided in implementations of the disclosure, N represents a frame length, and M represents a frame shift. For example, for a pulse code modulation (PCM) audio signal of 6 seconds with a sampling rate of 50 kilohertz (kHz), the frame length can be 30 ms, the frame shift can be 15 ms, then the above audio signal is divided into 401 audio frames, and the number of sampling points, i.e., the number of samples, of each audio frame is 1500. In an implementation, a window function that is usually used for voice signal processing, such as a rectangular window, a Hanning window, a triangular window, or the like may be selected for performing the windowing and frame division processing. For example, the second time interval for audio frame division can be preset as 0.1*Fs, where Fs is the current sampling rate of the target audio, the frame shift is set as 0.1*Fs-256, and the Hanning window has a length of 512. Referring to FIG. 9, FIG. 9 is a schematic diagram illustrating a possible effect of windowing processing provided in implementations of the disclosure, a windowing operation can efficiently prevent noise caused by signal discontinuity when different transfer functions are convolved with different data frames, where different processing effects are presented for different window lengths. After pre-processing, frame division, windowing, and other processing, the multiple audio frames of the target audio can be obtained.

As a better implementation scheme, the electronic device can obtain the dual-channel audio of the target audio by convolving an HRTF from a position of the sound source to a left ear and a right ear respectively for each of the multiple audio frames according to the position of the sound source corresponding to the time node of the audio frame.

The HRTF, also referred to as anatomical transfer function (ATF), is a sound effect positioning algorithm, which can produce a 3D sound effect by using technologies such as interaural time delay (ITD), interaural amplitude difference (IAD), and auricle frequency vibration, such that the listener can feel a surround sound effect when a sound reaches auricles, ear canals, and eardrums in human ears, where the system may be affected by factors such as an auricle, a head shape, or a shoulder. The sound travels in space and thus can be heard by people, and the sound changes when traveling from the sound source to human ear eardrums, where this change can be regarded as a filtering effect of two human ears for the sound, and the filtering effect can be simulated by audio processed by the HRTF. That is, a position of a sound source of the audio can be determined by the listener through the audio processed by the HRTF.

When the electronic device synthesizes the dual-channel audio by convolving the HRTF, and a sense of orientation is given to the target audio by assigning the position of the sound source of the target audio as a measuring point and convolving the HRTF. For example, an HRTF database of University of Cologne in Germany is used as a standard transfer function library, and position information of the sound source of the audio is represented by the 3D position coordinate of [azimuth, elevation, distance]. An HRTF from the position to two ears is determined with the 3D position coordinate as a parameter, and the HRTF from the position of the sound source to two ears respectively is convolved, to form the dual-channel audio of the target audio. The requirement of the HRTF database of University of Cologne in Germany for preset parameter ranges of the position is as follows: an azimuth ranges from −90° to 90°, an elevation ranges from −90° to 90°, a distance ranges from 0.5 m to 1.5 m, and a far field distance is greater than 1.5 m. In specific processing, there may be several situations below.

In situation 1, for the sound source at a fixed position, a 3D coordinate of the sound source may be considered unchanged at multiple time nodes. The electronic device determines an HRTF of the position of the sound source according to the position of the sound source of the target audio if the parameter falls within a preset parameter range of the HRTF function library, and performs convolution processing. Referring to FIG. 6, FIG. 6 is a schematic diagram illustrating a possible position of a sound source provided in implementations of the disclosure, the position 601 of the sound source of the target audio and the listener 602 are included. The HRTF database of University of Cologne in Germany is used as the standard transfer function library, the position of [20, 16, 1.6] of the sound source is input, and an HRTF corresponding to the position of [20, 16, 1.6] is determined if the position of [20, 16, 1.6] falls within the preset parameter range, where the HRTF is referred to as a first HRTF for ease of description. Left channel audio of the target audio is obtained by convolving the first HRTF from the position of the sound source to the left ear respectively for each of the multiple audio frames of the target audio. Right channel audio of the target audio is obtained by convolving the first HRTF from the position of the sound source to the right ear respectively for each of the multiple audio frames of the target audio.

In situation 2, for the sound source at a changing position, the electronic device can determine the position of the sound source at each of the multiple time nodes according to the preset time interval T. The electronic device determines an HRTF of the position of the sound source at each of the multiple time nodes according to the position of the sound source of the target audio if the parameter falls within the preset parameter range of the HRTF function library, and performs the convolution processing. Referring to FIG. 7, FIG. 7 is a schematic diagram illustrating a changing position of a sound source provided in implementations of the disclosure, the start position 701 of the target audio, the end position 702 of the target audio, and the listener 602 are included. The sound source of the target audio during playing needs to be moved from the position 701 to the position 702, and the position of the sound source at each of the multiple time nodes is determined between the position 701 and the position 702. An HRTF from the position of the sound source to the left ear and the right ear respectively is determined according to a position of the sound source corresponding to a start or end time node of a first audio frame, and a dual-channel audio frame of the first audio frame of the target audio is obtained by convolving the HRTF for the first audio frame. For example, the HRTF database of University of Cologne in Germany is used as the standard transfer function library, a position of [20, 16, 1.6] of the sound source at a time node corresponding to the first audio frame is input, and an HRTF from the position of [20, 16, 1.6] to the left ear and the right ear respectively is determined if the position of [20, 16, 1.6] falls within the preset parameter range. Left channel audio of the first audio frame is obtained by convolving the HRTF from the position of the sound source to the left ear for the first audio frame of the target audio. Right channel audio of the first audio frame is obtained by convolving the HRTF from the position of the sound source to the right ear for the first audio frame of the target audio. In the same way, the dual-channel audio of the target audio is obtained by convolving an HRTF of a relative position for each of the multiple audio frames of the target audio.

Figure 10:
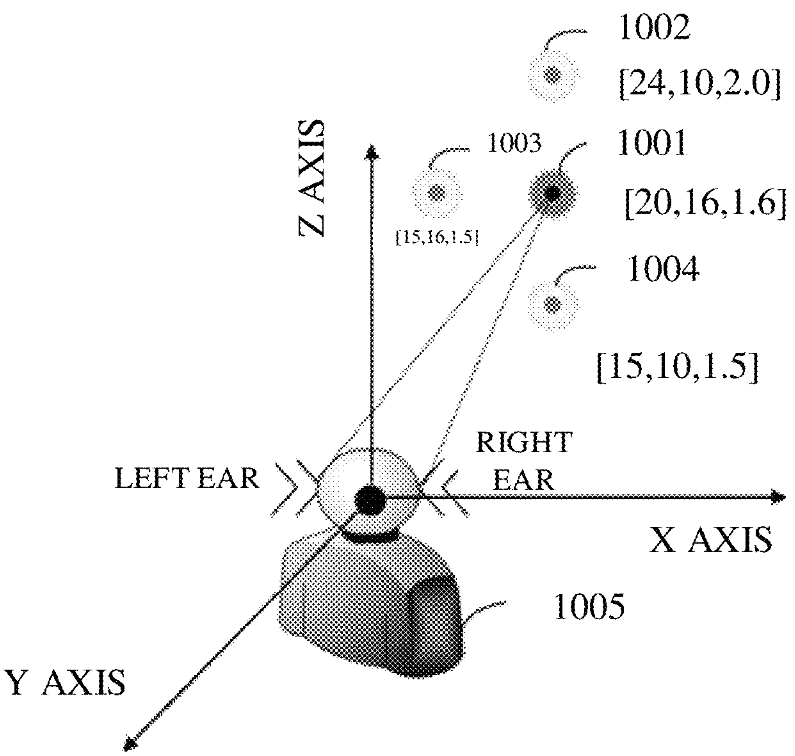
FIG. 10 is a schematic diagram illustrating another position of a sound source provided in implementations of the disclosure.

In situation 3, if the position of the sound source is determined as in situation 1 or 2, and a first position falls out of the preset parameter range of the HRTF function library, the electronic device can determine P position points around the first position, and obtain an HRTF corresponding to the first position by fitting HRTFs corresponding to the P position points, where the HRTF is referred to as a second HRTF for ease of description. P is an integer not less than 1. Referring to FIG. 10, FIG. 10 is a schematic diagram illustrating another possible position of a sound source provided in implementations of the disclosure, a first position 1001, a second position 1002, a third position 1003, and a fourth position 1004 of the target audio, and a listener 1005 are included. If the electronic device convolves an HRTF for an audio frame, and the selected first position 1001 falls out of the preset parameter range of the HRTF, P measuring points close to the second position 1002 are determined. For example, P is preset as 3, which indicates to determine three measuring points closest to the first position, i.e., the second position 1002, the third position 1003, and the fourth position 1004, and positions of the three measuring points each fall within the preset parameter range of the HRTF function library. The second HRTF corresponding to the first position is obtained by fitting HRTFs corresponding to the three measuring points. Optionally, the HRTF corresponding to the first position can be obtained by fitting the HRTFs corresponding to the three measuring points according to distance weights from the three measuring points to the first position.

At S205, the electronic device modulates power of the dual-channel audio of the target audio.

Specifically, in order that the target audio may not affect listening experience of the target music too much, the electronic device can perform power modulation on the target audio, i.e., decrease power of the target audio, before rendering the dual-channel audio of the target audio into the target music, such that the power of the target audio is lower than power of the target music. It should be noted that, modulating the power of the dual-channel audio is just a better implementation and as an optional scheme to improve user experience. The electronic device needs to firstly determine a time for rendering the target audio into the target music, i.e., determine a mixing time of the target audio, before modulating the power of the dual-channel audio of the target audio. The following illustrates several optional schemes for determining the mixing time of the target audio.

Figure 12:
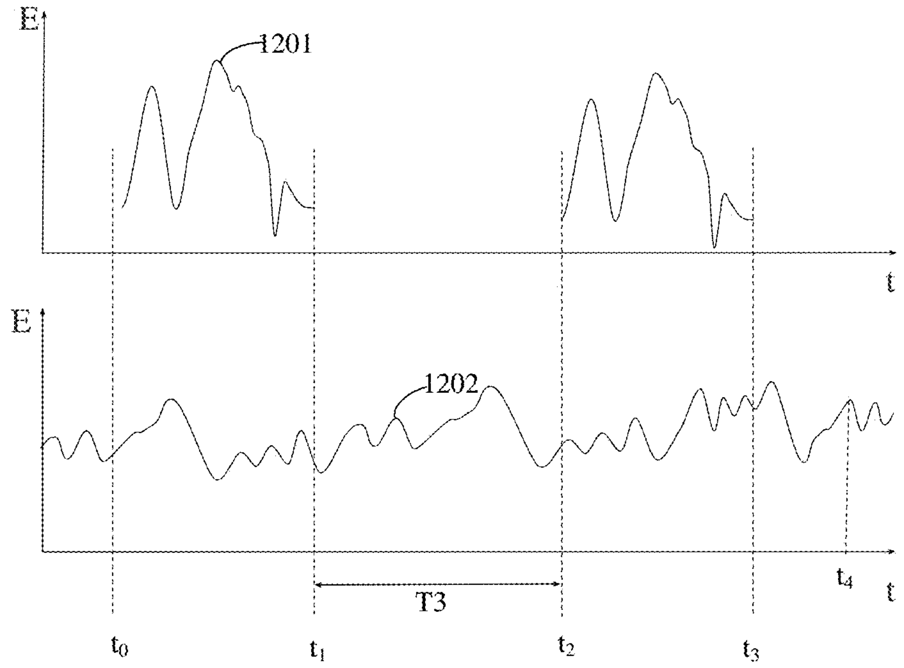
FIG. 12 is a schematic diagram illustrating a method for determining a mixing time of audio provided in implementations of the disclosure.

In scheme 1, the electronic device presets the mixing time of the target audio. Optionally, when the electronic device renders the target audio into the target music, the target audio can be mixed multiple times or occur circularly at a preset third time interval T3. Referring to FIG. 12, FIG. 12 is a schematic diagram illustrating a possible method for determining a mixing time of audio provided in implementations of the disclosure, target audio 1201 and target music 1202 are included. When the target audio is mixed, if the target audio has a length of 6 seconds (s), a first mixing time is preset as 5 s, and the third time interval T3 is preset as 7 s, it indicates that the target audio is mixed for the first time at the fifth second of the target music, the mixing of the target audio ends at the eleventh second, and the target audio is mixed for the second time at the eighteenth second of the target music. Optionally, the audio determined in above manner 1 and manner 2 can be mixed according to the scheme where the first mixing time of the target audio is preset. For example, in case 1, a sound that can characterize flowers, plants, insects, and birds in a field environment can be preset to be mixed at the fifth second during playing of the song of Daoxiang, to produce a scene effect that Daoxiang is played in the field environment.

Figure 13:
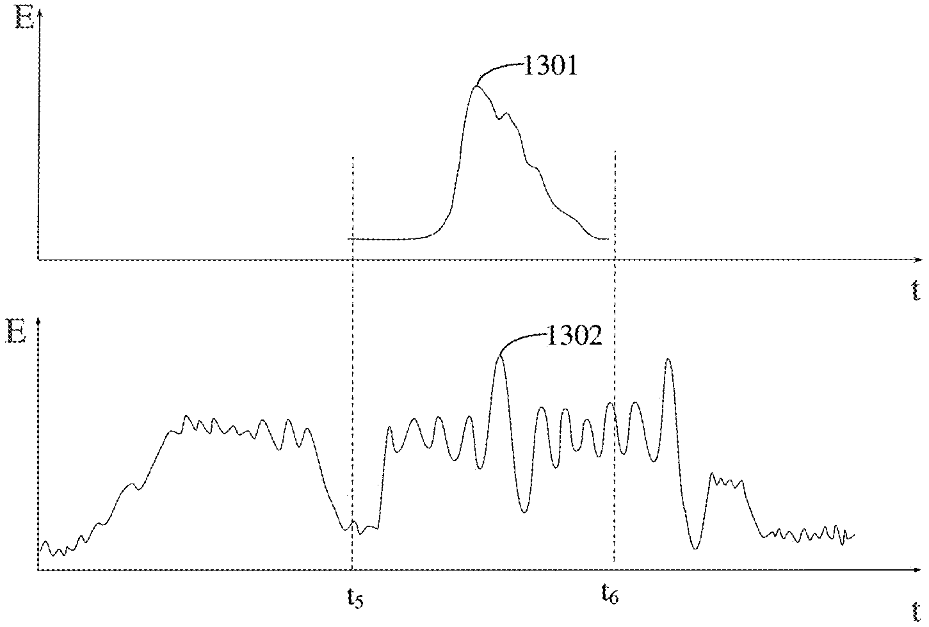
FIG. 13 is a schematic diagram illustrating another method for determining a mixing time of audio provided in implementations of the disclosure.

In scheme 2, the electronic device determines the mixing time of the target audio according to a timestamp of the lyrics. For example, the electronic device can determine the target audio in manner 2, and a timestamp to start singing a matched lyric is the mixing time of the target audio since the target audio is matched with the lyrics. Referring to FIG. 13, FIG. 13 is a schematic diagram illustrating another possible method for determining a mixing time of audio provided in implementations of the disclosure, target audio 1301 and target music 1302 are included, where the target audio 1301 is determined by matching lyrics sung between t5 and t6. For example, referring to FIG. 4, in case 3, after "sound of flowers, plants, and insects chirping in the field" matched with a lyric of "daoxiang" is determined as the target audio, a mixing time is a timestamp to start singing the lyric of "daoxiang".

In scheme 3, the electronic device receives a selection or input operation of the user and determines a time indicated by the selection or input operation as the mixing time of the target audio. For example, referring to FIG. 5, in case 4, if "sound of insects chirping" is dragged by the user onto a lyric of "yinghuochong", a time to start singing the lyric of "yinghuochong" is the mixing time of the audio.

Figure 11:
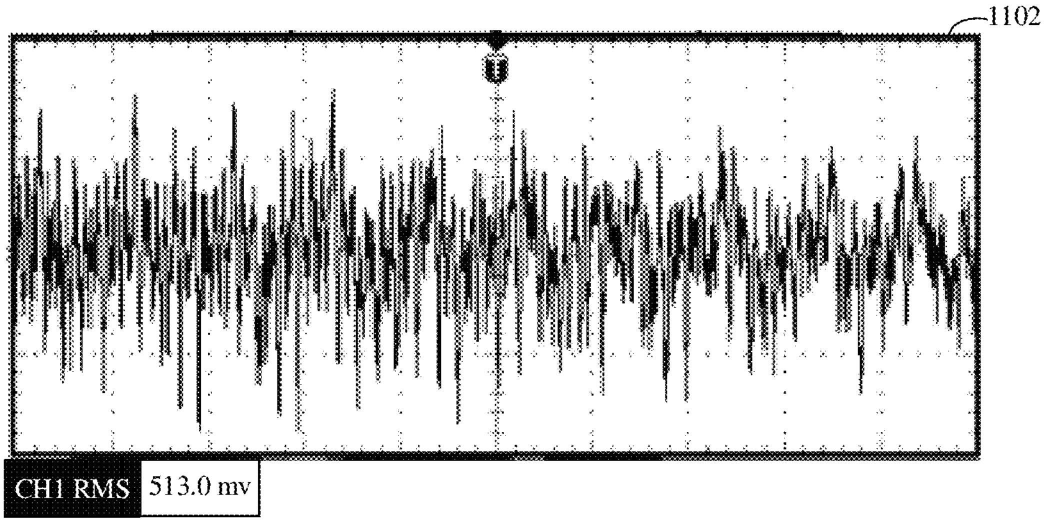
FIG. 11 is a schematic diagram illustrating measurement for a root mean square (RMS) value provided in implementations of the disclosure.

The power modulation can be performed on the audio according to the mixing time of the audio after the electronic device determines the mixing time of the target audio. Optionally, the electronic device can proportionally reduce power of multiple pieces of audio when the multiple pieces of audio need to be mixed at a same time, so that an overall power output finally does not exceed a predetermined power threshold. Since the audio signal is a random signal, power of the audio signal can be represented by a root mean square (RMS) value, which is a measurement result of a sinusoidal signal with the same amplitude as a peak value of the audio signal, is close to an average value, and represents heating energy of the audio. The RMS value is also referred to as effective value, which is calculated by firstly squaring, then averaging, and extracting a square root. Referring to FIG. 11, FIG. 11 is a schematic diagram illustrating measurement for an RMS value provided in implementations of the disclosure, it indicates that in the case of the audio signal, an RMS value of audio CH1 at 1.00 volt (V) is 513.0 millivolt (mV). By performing the power modulation on the target audio, the sound effect element can be prevented from covering up the music signal due to too great loudness, and a situation that the sound effect element has no obvious effect due to too low loudness can also be avoided, where the power can be modulated through the following methods.

Figure 14:
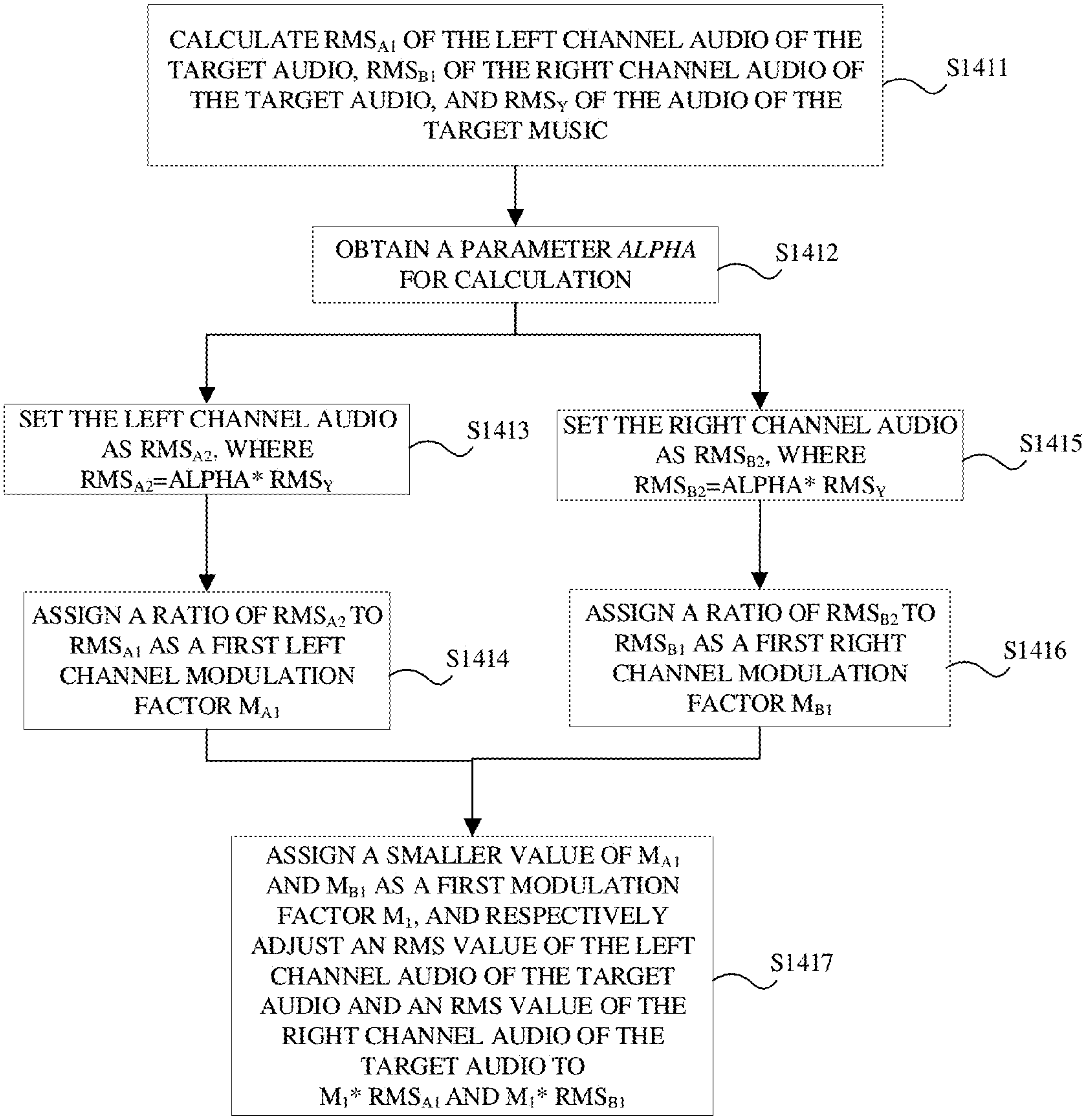
FIG. 14 is a schematic flowchart illustrating a method for power modulation provided in implementations of the disclosure.

In method 1, a first modulation factor is determined, and the target audio is modulated to have an RMS value which is an alpha multiple of an RMS value of the target music, where alpha is a parameter preset or indicated by an input operation received from the user, and 0<alpha<1. Referring to FIG. 14, FIG. 14 is a schematic flowchart illustrating a method for power modulation provided in implementations of the disclosure, the method includes the following steps.

At S1411, $RMS_{A1}$ of the left channel audio of the target audio, $RMS_{B1}$ of the right channel audio of the target audio, and $RMS_Y$ of the audio of the target music are calculated.

Specifically, since the left channel audio and the right channel audio of the target audio are processed with a convolution function, power of a single channel needs to be respectively calculated during modulating of the audio.

At S1412, a parameter alpha is obtained for calculation.

At S1413, the left channel audio is set as $RMS_{A2}$, where $RMS_{A2}$=alpha*$RMS_Y$.

At S1414, a ratio of $RMS_{A2}$ to $RMS_{A1}$ is assigned as a first left channel modulation factor $M_{A1}$.

Specifically, the ratio of $RMS_{A2}$ to $RMS_{A1}$ is assigned as the first left channel modulation factor $M_{A1}$, that is, $$M_{A1} = \frac{RMS_{A2}}{RMS_{A1}}.$$

At S1415, the right channel audio is set as $RMS_{B2}$, where $RMS_{B2}$=alpha*$RMS_Y$.

At S1416, a ratio of $RMS_{B2}$ to $RMS_{B1}$ is assigned as a first right channel modulation factor $M_{B1}$.

Specifically, the ratio of $RMS_{B2}$ to $RMS_{B1}$ is assigned as the first right channel modulation factor $M_{B1}$, that is, $$M_{B1} = \frac{RMS_{B2}}{RMS_{B1}}.$$

At S1417, a smaller value of $M_{A1}$ and $M_{B1}$ is assigned as a first modulation factor $M_1$, and an RMS value of the left channel audio of the target audio and an RMS value of the right channel audio of the target audio are respectively adjusted to $M_1$*$RMS_{A1}$ and $M_1$*$RMS_{B1}$.

Specifically, the smaller value of $M_{A1}$ and $M_{B1}$ is assigned as the first modulation factor $M_1$, that is $M_1$=min ($M_{A1}$, $M_{B1}$).

At S1417, a smaller value of $M_{A1}$ and $M_{B1}$ is assigned as a first modulation factor $M_1$, and an RMS value of the left channel audio of the target audio and an RMS value of the right channel audio of the target audio are respectively adjusted to $M_1$*$RMS_{A1}$ and $M_1$*$RMS_{B1}$.

Specifically, the smaller value of $M_{A1}$ and $M_{B1}$ is assigned as the first modulation factor $M_1$, that is $M_1$=min ($M_{A1}$, $M_{B1}$).

Since the target audio is processed with the convolution function, in order to keep the audio-visual modulation effect of the above dual audio unchanged, amplitude modulation of the left and right channels needs to use a same modulation factor. Therefore, the smaller value of $M_{A1}$ and $M_{B1}$ is assigned as the first modulation factor $M_1$.

Optionally, during modulation in manner 1, if an RMS value of mixed audio obtained by mixing modulated target audio into the target music exceeds a value range of the computer number, the power of the target audio needs to be decreased, otherwise, data overflow may be resulted. In the method illustrated in FIG. 14, if the system presets alpha=0.5, an RMS value of the target music modulated by the first modulation factor is 6 decibel (dB) less than the RMS value of the target music, thereby ensuring that occurrence of the sound effect element may not affect listening of the original music too much.

Figure 15:
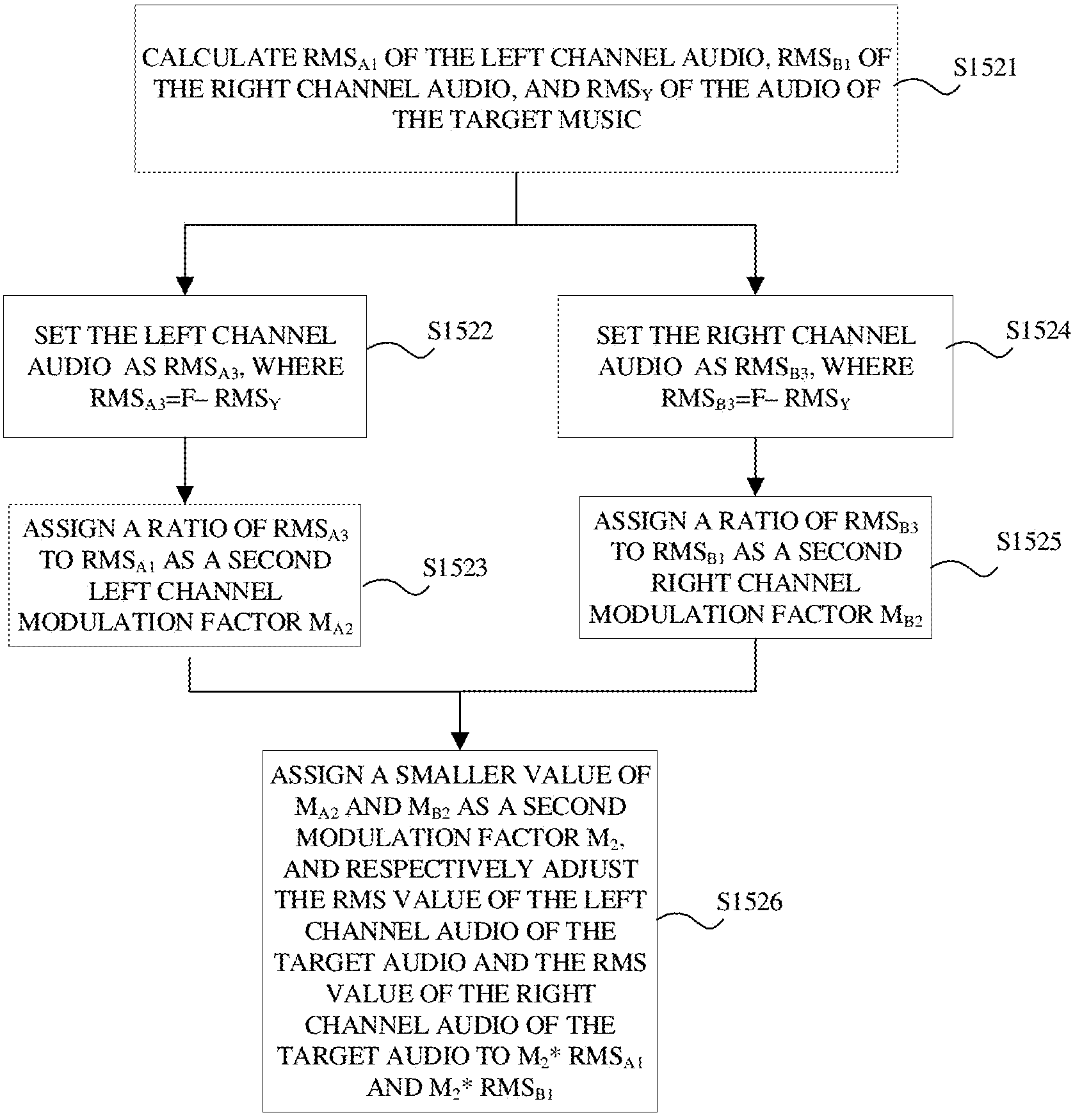
FIG. 15 is a schematic flowchart illustrating another method for power modulation provided in implementations of the disclosure.

In method 2, a second modulation factor is determined, and the RMS value of the target audio is modulated, such that the sum of the RMS value of the target music and the RMS value of the target audio does not exceed a maximum value in the value range of the computer number. The RMS value of the target audio is modulated to be always less than the RMS value of the target music. Referring to FIG. 15, FIG. 15 is a schematic flowchart illustrating another possible method for power modulation provided in implementations of the disclosure, F is the maximum value in the value range of the computer number, and the method mainly includes the following steps.

At S1521, $RMS_{A1}$ of the left channel audio of the target audio, $RMS_{B1}$ of the right channel audio of the target audio, and $RMS_Y$ of the audio of the target music are calculated.

At S1522, the left channel audio is set as $RMS_{A3}$, where $RMS_{A3}=F-RMS_Y$.

At S1523, a ratio of $RMS_{A3}$ to $RMS_{A1}$ is assigned as a second left channel modulation factor $M_{A2}$.

Specifically, the ratio of $RMS_{A3}$ to $RMS_{A1}$ is assigned as the second left channel modulation factor $M_{A2}$, that is, $$M_{A2} = \frac{F - RMS_Y}{RMS_{A1}}.$$

At S1524, the right channel audio is set as $RMS_{B3}$, where $RMS_{B3}=F-RMS_Y$.

At S1525, a ratio of $RMS_{B3}$ to $RMS_{B1}$ is assigned as a second right channel modulation factor $M_{B2}$.

Specifically, the ratio of $RMS_{B3}$ to $RMS_{B1}$ is assigned as the second right channel modulation factor $M_{B2}$, that is, $$M_{B2} = \frac{F - RMS_Y}{RMS_{B1}}.$$

At S1526, a smaller value of $M_{A2}$ and $M_{B2}$ is assigned as a second modulation factor $M_2$, and the RMS value of the left channel audio of the target audio and the RMS value of the right channel audio of the target audio are respectively adjusted to $M_2*RMS_{A1}$ and $M_2*RMS_{B1}$.

Specifically, the smaller value of $M_{A2}$ and $M_{B2}$ is assigned as the second modulation factor $M_2$, that is, $M_2=\min(M_{A2}, M_{B2})$.

In the method illustrated in FIG. 15, the electronic device can use the second modulation factor, such that the sum of the RMS value of the target music and the RMS value of the target audio does not exceed the maximum value in the value range of the computer number, where with the modulation method, it can be ensured that occurrence of the sound effect element may not affect listening of the original music too much as much as possible under the premise of preventing data overflow.

In method 3, a third modulation factor is determined, and the RMS value of the target audio is modulated, such that the RMS value of the target audio is less than the RMS value of the target music. The third modulation factor can be determined in other manners and is used to modulate the RMS value of the target music. For example, a smaller value of the first modulation factor and the second modulation factor is assigned as the third modulation factor, i.e., on condition that a value of the first modulation factor is less than a value of the second modulation factor, the first modulation factor is determined as the modulation factor and is used to modulate the RMS value of the target audio, such that the RMS value of the target audio is less than the RMS value of the target music. Similarly, on condition that the value of the second modulation factor is less than the value of the first modulation factor, the second modulation factor is determined as the modulation factor and is used to modulate the RMS value of the target audio, such that the RMS value of the target audio is less than the RMS value of the target music. With the modulation method, under the premise of preventing data overflow, an RMS proportional relation between sound effect data and music data can be kept unchanged as much as possible, which can prevent the target audio from covering up the target music due to excessive power, and also prevent a situation that the target audio has no obvious effect due to too low power, thereby ensuring a dominant position of the target music.

Figure 16:
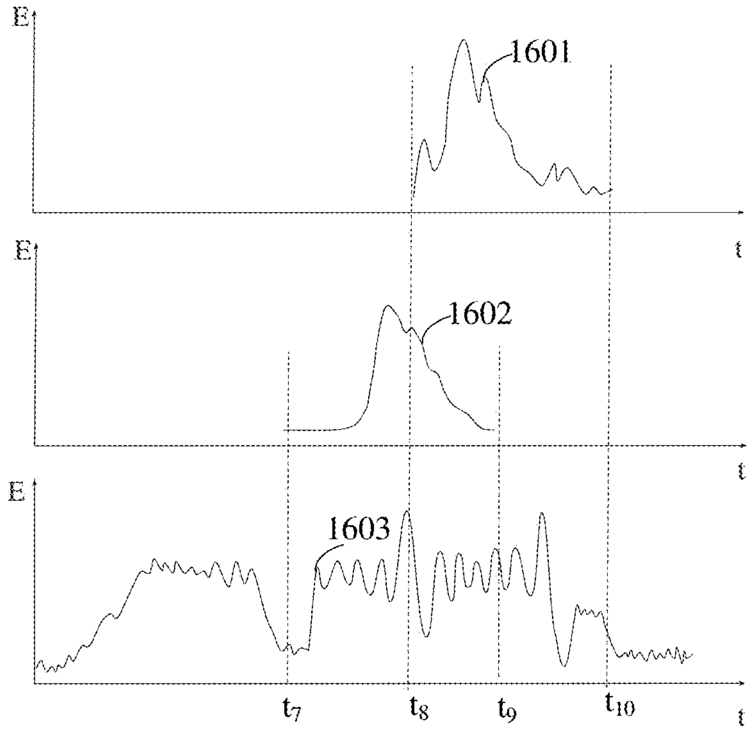
FIG. 16 is a schematic diagram illustrating another method for determining a mixing time of audio provided in implementations of the disclosure.

Optionally, audio of various sound effect elements may be used to construct a listening scene since the music is played in real time. Referring to FIG. 16, FIG. 16 is a schematic diagram illustrating another method for determining a mixing time of audio provided in implementations of the disclosure, first audio 1601, second audio 1602, and target music 1603 are included. A mixing time of the second audio 1602 is a time period from t7 to t9. The first audio needs to be mixed at t8 between t7 and t9. When multiple pieces of audio need to be mixed at a same time, several kinds of audio need to be mixed firstly with an average adjustment weight method, and the power modulation is performed on the mixed audio, such that an RMS value of the mixed audio is less than the RMS value of the target music.

At S206, the electronic device renders the dual-channel audio of the target audio into target music to produce an effect that the target music is played in the target scene.

Specifically, the electronic device obtains mixed music by mixing the dual-channel audio of the target audio into the target music according to the mixing time of the target audio determined at S206, such that the listener can feel the effect that the target music is played in the target scene when a playing device plays the mixed music.

Optionally, the electronic device may also serve as the playing device and be configured to play the mixed music. In this case, the playing device is a playing module integrated into the electronic device, and the electronic device may be a device such as a smart earphone with a calculation capability. Optionally, the electronic device can transmit the mixed music to the playing device through a wired interface, a wireless interface (e.g., a WiFi interface, a Bluetooth interface), etc., and the playing device is configured to play the mixed music. In this case, the electronic device may be a server (or a server cluster), a computer host, or other electronic devices, and the playing device may be a device such as a Bluetooth earphone, a wired earphone, or the like.

For example, after the electronic device assigns the song of Daoxiang as the target music, assigns a pastoral scene as the target scene, and determines “sound of flowers, plants, insects, and birds in the field”, “sound of streams”, and “sound of flash special effect” as the target audio that represents the pastoral scene, an operation such as the convolution processing, the power modulation, or the like is performed on the target audio, and the mixed audio is obtained by mixing the target audio into audio of Daoxiang according to the mixing time of the target audio. The mixed audio is transmitted via an earphone connection interface to a headphone, such that when listening to Daoxiang with the headphone, the listener can feel the sound effect element lingering around ears and feel like being in the middle of a field and smelling the fragrance of rice.

In the method illustrated in FIG. 2, the sound effect element that can characterize a listening scene is mixed when the user listens to the music. When the audio of the sound effect element is mixed into the music, the electronic device firstly determines the position of the sound source of the audio, and performs the audio-visual modulation on the audio of the sound effect element according to the position of the sound source, such that the sound effect element when entering ears seems to come from the position of the sound source, and the sound effect element can construct a more real listening scene, thereby improving a sense of presence and immersion of the user when listening to the music.

The above illustrates the methods in implementations of the disclosure in detail, and the following provides an apparatus in implementations of the disclosure.

Figure 17:
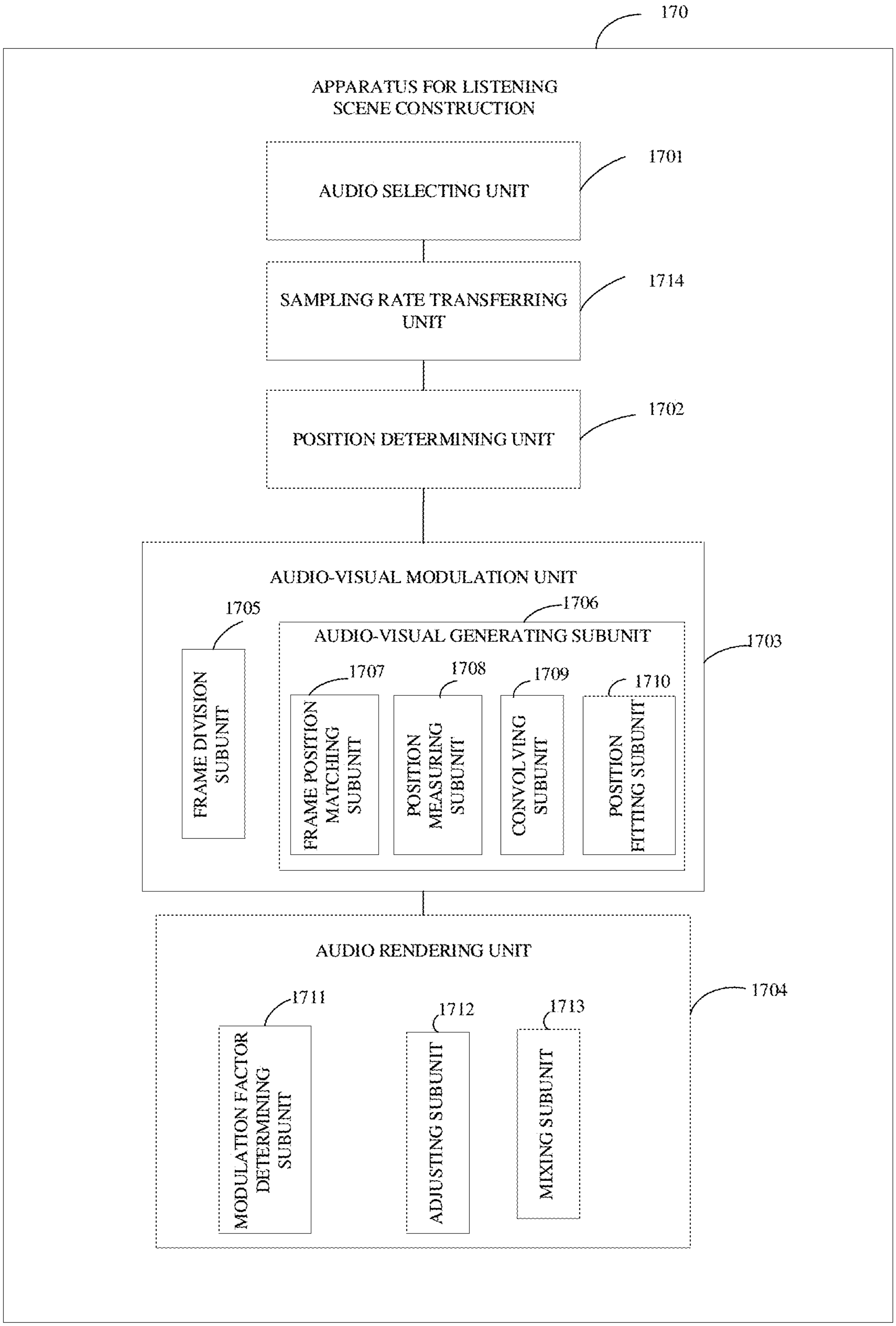
FIG. 17 is a schematic structural diagram illustrating an apparatus for listening scene construction provided in implementations of the disclosure.

Referring to FIG. 17, FIG. 17 is a schematic structural diagram illustrating an apparatus for listening scene construction 170 provided in implementations of the disclosure, the server 170 may include an audio selecting unit 1701, a position determining unit 1702, an audio-visual modulation unit 1703, and an audio rendering unit 1704, where each unit will be described in detail below.

The audio selecting unit 1701 is configured to determine target audio, where the target audio is used to characterize a sound feature in a target scene. The position determining unit 1702 is configured to determine a position of a sound source of the target audio. The audio-visual modulation unit 1703 is configured to obtain dual-channel audio of the target audio by performing audio-visual modulation on the target audio according to the position of the sound source, where the dual-channel audio of the target audio during simultaneous output is able to produce an effect that the target audio is from the position of the sound source. The audio rendering unit 1704 is configured to render the dual-channel audio of the target audio into target music to produce an effect that the target music is played in the target scene.

It can be seen that, a sound effect element that can characterize a listening scene is mixed when a user listens to music. When audio of the sound effect element is mixed into the music, the audio-visual modulation is performed on the audio of the sound effect element according to the position of the sound source, such that the sound effect element when entering ears seems to come from the position of the sound source, and the sound effect element can construct a more real listening scene, thereby improving a sense of presence and immersion of the user when listening to the music.

In another optional scheme, the target audio before a vocal part of the target music occurs or after the vocal part ends is audio matched according to type information or whole lyrics of the target music, and/or, the target audio in the vocal part of the target music is audio matched according to a lyric content of the target music.

That is, the target song before a vocal part of the target music occurs or after the vocal part ends is in a stage where there is only an accompaniment but no vocal singing. In this stage, the target audio can be determined according to a type or whole lyric content of the song, such that a listener can listen to audio matched with a style or content of the song in an accompaniment part of the song. In the vocal part of the target music, a main effect of the music is conveyed by singing lyrics, so the target audio is matched according to a specific content of the lyrics. As such, with a music lyric-oriented method for audio matching, added audio is more consistent with the content of the target music, thereby improving experience of listening to music.

In another optional scheme, the audio selecting unit 1701 configured to determine the target audio is specifically configured to determine the target audio by receiving a selection operation for the target audio.

It can be seen that, one or more pieces of audio are provided to the user when audio to be mixed is selected, and the target audio is determined by receiving the selection operation for the target audio. That is, when the user listens to the music, audio can be autonomously selected by the user according to own preferences to mix into the music, thereby constructing an individualized listening scene, which stimulates a creation and desire of the user and increases interest of listening experience.

In another optional scheme, the position determining unit 1702 configured to determine the position of the sound source of the target audio is specifically configured to determine a position of the sound source of the target audio at each of multiple time nodes. The audio-visual modulation unit configured to obtain the dual-channel audio of the target audio by performing the audio-visual modulation on the target audio according to the position of the sound source is specifically configured to obtain the dual-channel audio of the target audio by performing the audio-visual modulation on the target audio according to the position of the sound source at each of the multiple time nodes.

At present, when a device plays the music with an added sound effect element, the position of the sound source is fixed, a left ear and a right ear hear the same content, and a sound position is centered or fixed. However, a position of a sound source of the sound effect element in space may be fixed relative to human ears or may be displaced. With the apparatus provided in implementations of the disclosure, for audio characterizing a target listening scene, the position of the sound source of the target audio at each of the multiple time nodes is determined according to a preset time interval, the audio-visual modulation is performed on the target audio according to the position of the sound source at each of the multiple time nodes, such that the effect that the target audio is from the position of the sound source is produced, and a moving track can be changing, thereby increasing a sense of presence of the user and constructing a more natural listening scene.

In another optional scheme, the audio-visual modulation unit 1703 includes a frame division subunit 1705 and an audio-visual generating subunit 1706. The frame division subunit 1705 is configured to divide the target audio into multiple audio frames. The audio-visual generating subunit 1706 is configured to obtain the dual-channel audio of the target audio by convolving an HRTF from a position of the sound source to a left ear and a right ear respectively for each of the multiple audio frames according to a position of the sound source corresponding to a time node of the audio frame.

It can be seen that, frame division processing needs to be performed on the target audio before using the HRTF to perform the audio-visual modulation, to improve an effect of audio processing. The HRTF is convolved through a divided audio frame, such that the user can feel the effect that the target audio is from the position of the sound source when the dual-channel audio of the target audio is played in the left ear and the right ear, and presence of the sound effect element is more real.

In another optional scheme, the audio-visual generating subunit 1706 includes a frame position matching subunit 1707, a position measuring subunit 1708, and a convolving subunit 1709. The frame position matching subunit 1707 is configured to obtain a first position of the sound source corresponding to a first audio frame, where the first audio frame is one of the multiple audio frames. The position measuring subunit 1708 is configured to determine a first HRTF corresponding to the first position on condition that the first position falls within a preset measuring point range, where each measuring point in the preset measuring point range corresponds to an HRTF. The convolving subunit 1709 is configured to obtain dual-channel audio of the first audio frame of the target audio by convolving the first HRTF from the first position to the left ear and the right ear respectively for the first audio frame.

It can be seen that, since the position of the sound source of the target audio can change continuously, for the first audio frame in the multiple audio frames, the first position corresponding to the first audio frame is firstly determined, an HRTF corresponding to the first position is determined, and then convolution processing is performed. The dual-channel audio of the target audio obtained by convolving the HRTF is played in the left ear and right ear of the listener, such that the listener can feel like that the target music comes from the position of the sound source, thereby improving a sense of presence and immersion of the user when listening to the music.

In another optional scheme, the position measuring subunit 1708 is further configured to determine P measuring position points according to the first position on condition that the first position falls out of the preset measuring point range, where the P measuring position points are P points falling within the preset measuring point range, and P is an integer not less than 1. The apparatus further includes a position fitting subunit 1710 configured to obtain a second HRTF corresponding to the first position by fitting according to HRTFs respectively corresponding to the P measuring position points. The convolving subunit 1709 is further configured to obtain the dual-channel audio of the first audio frame of the target audio by convolving the second HRTF from the first position to the left ear and the right ear respectively for the first audio frame.

It can be seen that, the measuring point range is preset for the HRTF, and each measuring point in the preset measuring point range corresponds to an HRTF. On condition that the first position falls out of the measuring point range, P measuring position points that fall within the preset range and are close to the first position can be determined, and the HRTF of the first position can be obtained by fitting the HRTFs respectively corresponding to the P measuring position points, which can improve accuracy of an audio-visual modulation effect of the target audio and enhance an effect stability of a processing process of the target audio.

In another optional scheme, the audio rendering unit 1704 configured to render the dual-channel audio of the target audio into the target music to produce the effect that the target music is played in the target scene specifically includes a modulation factor determining subunit 1711, an adjusting subunit 1712, and a mixing subunit 1713. The modulation factor determining subunit 1711 is configured to determine a modulation factor according to an RMS value of the left channel audio, an RMS value of the right channel audio, and an RMS value of the target music. The adjusting subunit 1712 is configured to obtain adjusted left channel audio and adjusted right channel audio by adjusting the RMS value of the left channel audio and the RMS value of the right channel audio according to the modulation factor, where an RMS value of the adjusted left channel audio and an RMS value of the adjusted right channel audio each are not greater than the RMS value of the target music. The mixing subunit 1713 is configured to mix the adjusted left channel audio into a left channel of the target music as rendered audio of the left channel of the target music, and mix the adjusted right channel audio into a right channel of the target music as rendered audio of the right channel of the target music.

At present, when the device plays the music with added sound effect elements, sound intensities of the added sound effect elements are different. Some of the sound effect elements each have too great loudness, which easily leads to data overflow to cover up a sound of the music, and some of the sound effect elements each have too low loudness, which is almost imperceptible, thereby affecting experience of the user when listening to the music. With the apparatus provided in implementations of the disclosure, when the target audio is mixed into the music, power of the target music is firstly modulated to change a feature, such as loudness, of the music, which can prevent the sound effect element from covering up an original music signal and can also prevent a situation that the sound effect element has no obvious effect due to too low loudness, such that audio of the added sound effect element will not affect the user to listen to original music.

In another optional scheme, the RMS value of the left channel audio is $RMS_{A1}$, the RMS value of the right channel audio is $RMS_{B1}$, and the RMS value of the target music is $RMS_Y$. The modulation factor determining subunit 1711 configured to determine the modulation factor according to the RMS value of the left channel audio, the RMS value of the right channel audio, and the RMS value of the target music is specifically configured to perform the following. The RMS value of the left channel audio is adjusted to $RMS_{A2}$, and the $RMS_Y$ value of the right channel audio is adjusted to $RMS_{B2}$, such that $RMS_{A2}$, $RMS_{B2}$, and $RMS_Y$ satisfy: $RMS_{A2}$=alpha*$RMS_Y$ and $RMS_{B2}$=alpha*$RMS_Y$, where alpha is a preset scale factor, and 0<alpha<1. A ratio of $RMS_{A2}$ to $RMS_{A1}$ is assigned as a first left channel modulation factor $M_{A1}$, that is, $$M_{A1} = \frac{RMS_{A2}}{RMS_{A1}}.$$

A ratio of $RMS_{B2}$ to $RMS_{B1}$ is assigned as a first right channel modulation factor $M_{B1}$, that is, $$M_{B1} = \frac{RMS_{B2}}{RMS_{B1}}.$$

A smaller value of $M_{A1}$ and $M_{B1}$ is assigned as a first group value $M_1$, that is, $M_1$=min ($M_{A1}$,$M_{B1}$). The first group value is determined as the modulation factor.

It can be seen that, by determining the modulation factor according to the RMS value of the left channel audio of the target music, the RMS value of the right channel audio of the target music, and the RMS value of the target music, and modulating power of the target audio according to the modulation factor, an RMS value of the target audio is controlled to be proportional to the RMS value of the target music, such that appearance of the target audio may not affect listening of the original music too much. A value of alpha, the ratio alpha of the sound effect element to the target music, can be preset by a system or set by the user according to their own preferences, thereby constructing an individualized listening effect and increasing interest of listening experience.

In another optional scheme, the modulation factor determining subunit 1713 is further configured to perform the following. The RMS value of the left channel audio is adjusted to $RMS_{A3}$, and the RMS value of the right channel audio is adjusted to $RMS_{B3}$, such that $RMS_{A3}$, $RMS_{B3}$, and $RMS_Y$ satisfy: $RMS_{A3}=F-RMS_Y$, where F is a maximum number of numbers that a floating-point type is able to represent, and $RMS_{B3}=F-RMS_Y$. A ratio of $RMS_{A3}$ to $RMS_{A1}$ is assigned as a second left channel modulation factor $M_{A2}$, that is, $$M_{A2} = \frac{RMS_{A3}}{RMS_{A1}}.$$

A ratio of $RMS_{B3}$ to $RMS_{B1}$ is assigned as a second right channel modulation factor $M_{B2}$, that is $$M_{B2} = \frac{RMS_{B3}}{RMS_{B1}}.$$

A smaller value of $M_{A2}$ and $M_{B2}$ is assigned as a second group value $M_2$, that is, $M_2=\min(M_{A2},M_{B2})$, where the first group value is less than the second group value.

It can be seen that, an RMS value of a mixed rendered audio should not to be greater than a maximum value in a value range of a computer number when the modulation factor is determined, so that under the premise of preventing data overflow, the target audio can be prevented from covering up the target music due to excessive power as much as possible, and a situation that the target audio has no obvious effect due to too low power can also be prevented, thereby ensuring a dominant position of the target music.

In another optional scheme, the apparatus further includes a sampling rate transferring unit 1714. The sampling rate transferring unit 1714 is configured to transfer a sampling rate of the target audio to a sampling rate of the target music on condition that the sampling rate of the target audio is different from the sampling rate of the target music, after determining the target audio and before determining the position of the sound source of the target audio.

It can be seen that, after the target audio is determined, if the sampling rate of the target audio is different from the sampling rate of the target music, a sampling rate of the sound effect element is transferred to the sampling rate of the target music, which makes the sound effect element sounds more natural when mixing.

It can be seen that, through the apparatus described in FIG. 17, a sound effect element that can characterize a listening scene is mixed when the user listens to music. When audio of the sound effect element is mixed into the music, the audio-visual modulation is performed on the audio of the sound effect element according to the position of the sound source, such that the sound effect element when entering both ears seems to come from the position of the sound source, thereby improving a sense of presence and immersion of the user when listening to the music.

It should be noted that, implementation of each operation can also correspondingly refer to the corresponding description of the method implementations illustrated in FIG. 2. The apparatus 170 is the electronic device in the method implementations illustrated in FIG. 2 or is integrated into a module of the electronic device.

Figure 18:
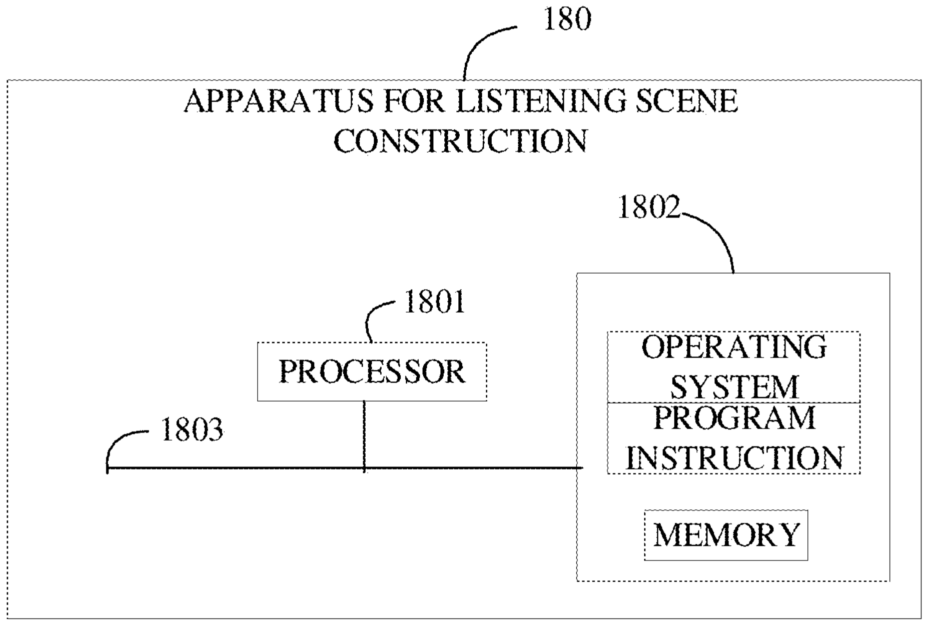
FIG. 18 is a schematic structural diagram illustrating another apparatus for listening scene construction provided in implementations of the disclosure.

Referring to FIG. 18, FIG. 18 is a schematic structural diagram illustrating another apparatus for listening scene construction 180 provided in implementations of the disclosure, the apparatus for listening scene construction may include a processor 1801, a memory 1802, and a bus 1803. The memory 1802 and the processor 1801 can be connected with each other via the bus 1803 or in other manners. In implementations of the disclosure, for example, the connection is via the bus, and the following will describe each unit in detail.

The processor 1801 (or referred to as central processing unit (CPU)) is a computer core and control core of the apparatus and can be configured to analyze various instructions in the apparatus and process various data in the apparatus. For example, the CPU can transmit various interaction data between internal structures of the apparatus.

The memory 1802 is a storage device in the apparatus and is configured to store programs and data. It can be understood that, the memory 1802 here may include an internal memory of the apparatus and may also include an extended memory supported by the apparatus. The memory 1802 provides a storage space that stores an operating system and other data of the apparatus, such as an Android system, an iOS system, or a Windows Phone system etc., which will not be limited herein.

The processor 1801 can be configured to invoke program instructions stored in the memory 1802 to execute the method provided in the implementations illustrated in FIG. 2.

It may be noted that, implementation of each operation can also correspondingly refer to the corresponding description of the method implementations illustrated in FIG. 2. The apparatus 180 is the electronic device in the method implementations illustrated in FIG. 2 or is integrated into a module of the electronic device.

A computer readable storage medium is further provided in implementations of the disclosure. The computer readable storage medium is configured to store computer instructions which, when running on a processor, are configured to perform the operations executed by the electronic device in the implementations illustrated in FIG. 2.

A computer program product is further provided in implementations of the disclosure. The computer program product, when running on a processor, is configured to perform the operations executed by the electronic device in the implementations illustrated in FIG. 2.

All or part of the above implementations can be implemented through software, hardware, firmware, or any combination thereof. When implemented by software, all or part of the above implementations can be implemented in the form of a computer program product. The computer program product includes one or more computer instructions. When the computer instructions are loaded and executed on a computer, all or part of the operations or functions of the implementations of the disclosure are performed. The computer can be a general-purpose computer, a special-purpose computer, a computer network, or other programmable apparatuses. The computer instructions can be stored in a computer readable storage medium, or transmitted through the computer readable storage medium. The computer instructions can be transmitted from one website, computer, server, or data center to another website, computer, server, or data center by wire (for example, via a coaxial cable, an optical fiber, or a digital subscriber line (DSL)) or wirelessly (for example, via infrared, radio, microwave, etc.). The computer readable storage medium can be any available medium accessible by a computer or a data storage device such as a server, a data center, or the like which is integrated with one or more available media. The available medium can be a magnetic medium (such as a soft disc, a hard disc, or a magnetic tape), an optical medium (such as a digital video disc (DVD)), or a semiconductor medium (such as a solid state disk (SSD)), etc.

What is claimed is:

1. A method for listening scene construction, comprising:

determining target audio, the target audio being used to characterize a sound feature in a target scene;

determining a position of a sound source of the target audio;

obtaining dual-channel audio of the target audio by performing audio-visual modulation on the target audio according to the position of the sound source, the dual-channel audio of the target audio during simultaneous output being able to produce an effect that the target audio is from the position of the sound source; and rendering the dual-channel audio of the target audio into target music to produce an effect that the target music is played in the target scene.

2. The method of claim 1, wherein the target audio before a vocal part of the target music occurs or after the vocal part ends is audio matched according to type information or whole lyrics of the target music; and/or the target audio in the vocal part of the target music is audio matched according to a lyric content of the target music.

3. The method of claim 1, wherein determining the position of the sound source of the target audio comprises:

determining a position of the sound source of the target audio at each of a plurality of time nodes; and obtaining the dual-channel audio of the target audio by performing the audio-visual modulation on the target audio according to the position of the sound source comprises:

obtaining the dual-channel audio of the target audio by performing the audio-visual modulation on the target audio according to the position of the sound source at each of the plurality of time nodes.

4. The method of claim 1, wherein obtaining the dual-channel audio of the target audio by performing the audio-visual modulation on the target audio according to the position of the sound source comprises:

dividing the target audio into a plurality of audio frames; and obtaining the dual-channel audio of the target audio by convolving a head-related transfer function (HRTF) from a position of the sound source to a left ear and a right ear respectively for each of the plurality of audio frames according to the position of the sound source corresponding to the audio frame.

5. The method of claim 4, wherein obtaining the dual-channel audio of the target audio by convolving the HRTF from the position of the sound source to the left ear and the right ear respectively for each of the plurality of audio frames according to the position of the sound source corresponding to the audio frame comprises:

obtaining a first position of the sound source corresponding to a first audio frame, the first audio frame being any one of the plurality of audio frames;

determining a first HRTF corresponding to the first position on condition that the first position falls within a preset measuring point range, each measuring point in the preset measuring point range corresponding to an HRTF; and obtaining dual-channel audio of the first audio frame of the target audio by convolving the first HRTF from the first position to the left ear and the right ear respectively for the first audio frame.

6. The method of claim 5, further comprising:

determining P measuring position points according to the first position on condition that the first position falls out of the preset measuring point range, the P measuring position points being P points falling within the preset measuring point range, P being an integer not less than 1;

obtaining a second HRTF corresponding to the first position by fitting according to HRTFs respectively corresponding to the P measuring position points; and obtaining the dual-channel audio of the first audio frame of the target audio by convolving the second HRTF from the first position to the left ear and the right ear respectively for the first audio frame.

7. The method of claim 1, wherein the dual-channel audio of the target audio comprises left channel audio and right channel audio; and rendering the dual-channel audio of the target audio into the target music comprises:

determining a modulation factor according to a root mean square (RMS) value of the left channel audio, an RMS value of the right channel audio, and an RMS value of the target music;

obtaining adjusted left channel audio and adjusted right channel audio by adjusting the RMS value of the left channel audio and the RMS value of the right channel audio according to the modulation factor, an RMS value of the adjusted left channel audio and an RMS value of the adjusted right channel audio each being not greater than the RMS value of the target music; and mixing the adjusted left channel audio into a left channel of the target music as rendered audio of the left channel of the target music, and mixing the adjusted right channel audio into a right channel of the target music as rendered audio of the right channel of the target music.

8. The method of claim 7, wherein the RMS value of the left channel audio before adjustment is $RMS_{A1}$, the RMS value of the right channel audio before adjustment is $RMS_{B1}$, and the RMS value of the target music is $RMS_Y$; and determining the modulation factor according to the RMS value of the left channel audio, the RMS value of the right channel audio, and the RMS value of the target music comprises:

adjusting the RMS value of the left channel audio to $RMS_{A2}$, and adjusting the RMS value of the right channel audio to $RMS_{B2}$, such that $RMS_{A2}$, $RMS_{B2}$, and $RMS_Y$ satisfy:

$RMS_{A2}=alpha*RMS_Y$; and $RMS_{B2}=alpha*RMS_Y$, alpha being a preset scale factor, and $0<alpha<1$;

assigning a ratio of $RMS_{A2}$ to $RMS_{A1}$ as a first left channel modulation factor $M_{A1}$, that is, $$M_{A1} = \frac{RMS_{A2}}{RMS_{A1}};$$

assigning a ratio of $RMS_{B2}$ to $RMS_{B1}$ as a first right channel modulation factor $M_{B1}$, that is, $$M_{B1} = \frac{RMS_{B2}}{RMS_{B1}};$$

assigning a smaller value of $M_{A1}$ and $M_{B1}$ as a first group value $M_1$, that is, $M_1=\min(M_{A1},M_{B1})$; and determining the first group value as the modulation factor.

9. The method of claim 8, wherein determining the modulation factor according to the RMS value of the left channel audio, the RMS value of the right channel audio, and the RMS value of the target music further comprises:

adjusting the RMS value of the left channel audio to $RMS_{A3}$, and adjusting the RMS value of the right channel audio to $RMS_{B3}$, such that $RMS_{A3}$, $RMS_{B3}$, and $RMS_Y$ satisfy:

$RMS_{A3}=F-RMS_Y$, $F$ being a maximum number of numbers that a floating-point type is able to represent; and $RMS_{B3}=F-RMS_Y$;

assigning a ratio of $RMS_{A3}$ to $RMS_{A1}$ as a second left channel modulation factor $M_{A2}$, that is, $$M_{A2} = \frac{RMS_{A3}}{RMS_{A1}};$$

assigning a ratio of $RMS_{B3}$ to $RMS_{B1}$ as a second right channel modulation factor $M_{B2}$, that is, $$M_{B2} = \frac{RMS_{B3}}{RMS_{B1}};$$

and assigning a smaller value of $M_{A2}$ and $M_{B2}$ as a second group value $M_2$, that is, $M_2=\min(M_{A2},M_{B2})$, the first group value being less than the second group value.

10. The method of claim 1, further comprising:

after determining the target audio and before determining the position of the sound source of the target audio, transferring a sampling rate of the target audio to a sampling rate of the target music on condition that the sampling rate of the target audio is different from the sampling rate of the target music.

11. An apparatus for listening scene construction, comprising:

a memory configured to store computer programs;

a processor configured to invoke the computer programs to:

determine target audio, the target audio being used to characterize a sound feature in a target scene;

determine a position of a sound source of the target audio;

obtain dual-channel audio of the target audio by performing audio-visual modulation on the target audio according to the position of the sound source, the dual-channel audio of the target audio during simultaneous output being able to produce an effect that the target audio is from the position of the sound source; and render the dual-channel audio of the target audio into target music to produce an effect that the target music is played in the target scene.

12. The apparatus of claim 11, wherein the target audio before a vocal part of the target music occurs or after the vocal part ends is audio matched according to type information or whole lyrics of the target music; and/or the target audio in the vocal part of the target music is audio matched according to a lyric content of the target music.

13. The apparatus of claim 11, wherein the processor configured to determine the position of the sound source of the target audio is specifically configured to:

determine a position of the sound source of the target audio at each of a plurality of time nodes; and the processor configured to obtain the dual-channel audio of the target audio by performing the audio-visual modulation on the target audio according to the position of the sound source is specifically configured to:

obtain the dual-channel audio of the target audio by performing the audio-visual modulation on the target audio according to the position of the sound source at each of the plurality of time nodes.

14. The apparatus of claim 11, wherein the processor configured to obtain the dual-channel audio of the target audio by performing the audio-visual modulation on the target audio according to the position of the sound source is configured to:

divide the target audio into a plurality of audio frames; and obtain the dual-channel audio of the target audio by convolving a head-related transfer function (HRTF) from a position of the sound source to a left ear and a right ear respectively for each of the plurality of audio frames according to the position of the sound source corresponding to the audio frame.

15. The apparatus of claim 14, wherein the processor configured to obtain the dual-channel audio of the target audio by convolving the HRTF from the position of the sound source to the left ear and the right ear respectively for each of the plurality of audio frames according to the position of the sound source corresponding to the audio frame is configured to:

obtain a first position of the sound source corresponding to a first audio frame, the first audio frame being one of the plurality of audio frames;

determine a first HRTF corresponding to the first position on condition that the first position falls within a preset measuring point range, each measuring point in the preset measuring point range corresponding to an HRTF; and obtain dual-channel audio of the first audio frame of the target audio by convolving the first HRTF from the first position to the left ear and the right ear respectively for the first audio frame.

16. The apparatus of claim 15, wherein the processor is further configured to:

determine P measuring position points according to the first position on condition that the first position falls out of the preset measuring point range, the P measuring position points being P points falling within the preset measuring point range, P being an integer not less than 1;

obtain a second HRTF corresponding to the first position by fitting according to HRTFs respectively corresponding to the P measuring position points; and obtain the dual-channel audio of the first audio frame of the target audio by convolving the second HRTF from the first position to the left ear and the right ear respectively for the first audio frame.

17. The apparatus of claim 11, wherein the processor configured to render the dual-channel audio of the target audio into the target music to produce the effect that the target music is played in the target scene specifically is configured to:

determine a modulation factor according to a root mean square (RMS) value of the left channel audio, an RMS value of the right channel audio, and an RMS value of the target music;

obtain adjusted left channel audio and adjusted right channel audio by adjusting the RMS value of the left channel audio and the RMS value of the right channel audio according to the modulation factor, an RMS value of the adjusted left channel audio and an RMS value of the adjusted right channel audio each being not greater than the RMS value of the target music; and mix the adjusted left channel audio into a left channel of the target music as rendered audio of the left channel of the target music, and mix the adjusted right channel audio into a right channel of the target music as rendered audio of the right channel of the target music.

18. The apparatus of claim 17, wherein the RMS value of the left channel audio before adjustment is $RMS_{A1}$, the RMS value of the right channel audio before adjustment is $RMS_{B1}$, and the RMS value of the target music is $RMS_Y$; and the processor configured to determine the modulation factor according to the RMS value of the left channel audio, the RMS value of the right channel audio, and the RMS value of the target music is specifically configured to:

adjust the RMS value of the left channel audio to $RMS_{A2}$, and adjust the RMS value of the right channel audio to $RMS_{B2}$, such that $RMS_{A2}$, $RMS_{B2}$, and $RMS_Y$ satisfy:

$RMS_{A2}$=alpha*$RMS_Y$; and $RMS_{B2}$=alpha*$RMS_Y$, alpha being a preset scale factor, and 0<alpha<1;

assign a ratio of $RMS_{A2}$ to $RMS_{A1}$ as a first left channel modulation factor $M_{A1}$, that is $$M_{A1} = \frac{RMS_{A2}}{RMS_{A1}};$$

assign a ratio of $RMS_{B2}$ to $RMS_{B1}$ as a first right channel modulation factor $M_{B1}$, that is, $$M_{B1} = \frac{RMS_{B2}}{RMS_{B1}};$$

assign a smaller value of $M_{A1}$ and $M_{B1}$ as a first group value $M_1$, that is, $M_1=\min(M_{A1},M_{B1})$; and determine the first group value as the modulation factor.

19. The apparatus of claim 18, wherein the processor configured to determine the modulation factor according to the RMS value of the left channel audio, the RMS value of the right channel audio, and the RMS value of the target music is further configured to:

adjust the RMS value of the left channel audio to $RMS_{A3}$, and adjust the RMS value of the right channel audio to $RMS_{B3}$, such that $RMS_{A3}$, $RMS_{B3}$, and $RMS_Y$ satisfy:

$RMS_{A3}=F-RMS_Y$, $F$ being a maximum number of numbers that a floating-point type is able to represent; and $RMS_{B3}=F-RMS_Y$;

assign a ratio of $RMS_{A3}$ to $RMS_{A1}$ as a second left channel modulation factor $M_{A2}$, that is, $$M_{A2} = \frac{RMS_{A3}}{RMS_{A1}};$$

assign a ratio of $RMS_{B3}$ to $RMS_{B1}$ as a second right channel modulation factor $M_{B2}$, that is, $$M_{B2} = \frac{RMS_{B3}}{RMS_{B1}};$$

and assign a smaller value of $M_{A2}$ and $M_{B2}$ as a second group value $M_2$, that is, $M_2=\min(M_{A2},M_{B2})$, the first group value being less than the second group value.

20. A non-volatile computer storage medium comprising computer programs which, when running on an electronic device, are operable with the electronic device to perform the method of claim 1.

* * * * *